(12) United States Patent
Kii et al.

(10) Patent No.: US 9,578,204 B2
(45) Date of Patent: Feb. 21, 2017

(54) IMAGE READING DEVICE

(71) Applicant: SEIKO EPSON CORPORATION, Tokyo (JP)

(72) Inventors: Soichiro Kii, Shiojiiri (JP); Etsuo Tsuji, Matsumoto (JP); Toshimitsu Ohara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/919,514

(22) Filed: Oct. 21, 2015

(65) Prior Publication Data

US 2016/0119501 A1    Apr. 28, 2016

(30) Foreign Application Priority Data

Oct. 22, 2014 (JP) ................................. 2014-215629

(51) Int. Cl.
*H04N 1/04* (2006.01)
*H04N 1/401* (2006.01)
*H04N 1/407* (2006.01)

(52) U.S. Cl.
CPC ............ *H04N 1/401* (2013.01); *H04N 1/4076* (2013.01)

(58) Field of Classification Search
CPC .............................. H04N 1/401; H04N 1/4076

USPC ................................. 358/486, 474, 498, 497
See application file for complete search history.

(56) References Cited

U.S. PATENT DOCUMENTS

| 5,864,408 | A | 1/1999 | Kumashiro |
| 8,467,111 | B2 * | 6/2013 | Kamio ............... H04N 1/00002 358/474 |

FOREIGN PATENT DOCUMENTS

| JP | 9-74465 | 3/1997 |
| JP | 2002-271620 | 9/2002 |

* cited by examiner

*Primary Examiner* — Houshang Safaipour
(74) *Attorney, Agent, or Firm* — Workman Nydegger

(57) ABSTRACT

A control unit performs a reading operation in a first mode in which a document on a document stand is read by moving a carriage which includes a reading portion, and in a second mode in which a document which is transported by a document transport unit is read using the carriage which is located at a reading position. The device includes a first white reference plate which is arranged in a first white reference reading position which is a standby position in the first mode, and a second white reference plate which is arranged on a side opposite to the first white reference plate by interposing a reading position in the second mode therebetween in the sub-scanning direction.

9 Claims, 13 Drawing Sheets

IMAGE READING DEVICE

BACKGROUND

1. Technical Field

The present invention relates to an image reading device which includes a flatbed-type document stand, and a document transport unit such as an automatic document feeder (ADF), and performs reading of a document which is fixed at the document stand, and reading of a document which is being transported at a reading position located in the middle of a transport path of the document transport unit using a reading unit included in a carriage which can move along the document which is fixed at the document stand.

2. Related Art

In the related art, as an image reading device, an apparatus which includes a flatbed-type document stand and an automatic document transport device (hereinafter, also referred to as Auto Document Feeder (ADF)) (as an example of document transport unit) was known. The image reading device includes a carriage which includes a reading unit such as a line sensor which reads a document on document stand glass from the lower part of the document stand, and a document stand cover which presses the document on the document stand. For example, an ADF is provided on the higher side (rear face side) of the document stand cover (for example, refer to JP-A-9-74465). In the image reading device of this type, an image of a document on the document stand is read using the reading unit by moving the carriage in the sub-scanning direction. In addition, documents which are in the middle of being transported from the ADF are sequentially read in the reading unit in a state in which the carriage is stopped at a reading position. In this manner, the image reading device which is disclosed in JP-A-9-74465 corresponds to a fixed document reading mode in which a document fixed at a document stand is read (corresponding to first mode), and a moving document reading mode in which a document which is being transported (being moved) from an automatic document transport device is read (corresponding to second mode).

In addition, in the image reading device of this type, a shading correction in which the entire image is corrected so as to have uniform brightness in average in order to reduce uneven density of the image is performed, and the apparatus includes a white reference plate which is read using a reading unit in order to obtain white reference data which is used when detecting density of a white level, or in the shading correction (refer to JP-A-9-74465). The carriage is moved to a reading position of the white reference plate, the reading unit reads reflected light of light with which the white reference plate is irradiated, and the white reference data is obtained, and is stored in a storage unit. In addition, image data of a document is generated by performing various corrections including the shading correction using the white reference data with respect to read data which is obtained by reading a document using the reading unit.

For example, in JP-A-9-74465, two white reference plates of a white reference plate which is provided in a document reading unit at a time of automatic document transport, and of a white reference plate which is used when reading a document which is in the outside of a document moving path, and is fixed at a document stand are included. In addition, a traveling body (carriage) reads the white reference plate for document stand which is located out of the document moving path before reading one document at a time of reading a plurality of documents which are transported from an automatic document transport device, and after reading the white reference plate, the carriage moves to a position of a document reading unit at the time of automatic document transport, and reads one document which is transported at the time of automatic document transport. In addition, when reading a second document and the following documents, the carriage reads a white reference plate in the document moving path which is located in the document reading unit. In the related art, since a white reference plate out of the document moving path is firstly read, it is possible to reduce an adverse effect which is applied at a time of detecting density of a white level due to attaching of dust, or the like, to the white reference plate, or at a time of a shading correction, when receiving a job of reading a plurality of documents.

Meanwhile, in JP-A-9-74465, the white reference plate for document stand which is located out of the document moving path is read before reading one document at a time of reading a plurality of documents which are transported from the automatic document transport device. For this reason, when a job of reading the plurality of documents is continued, it is necessary to move the traveling body to a position of the white reference plate for document stand which is located out of the document moving path from a position of the reading unit in the moving document reading mode. In addition, the traveling body moves to the reading unit of the document which is transported from the automatic document transport device after reading the white reference plate for document stand, and starts a reading operation of the document in the reading unit. For this reason, it takes for the traveling body a relatively long moving time in order to read the white reference plate, and as a result, there is a problem in that a starting period of a reading operation of a document is delayed.

SUMMARY

An advantage of some aspects of the invention is to provide an image reading device which can start a reading operation relatively early, even when it is necessary to read a white reference body before a reading operation.

Hereinafter, means of the invention, and operational effects thereof will be described.

According to an aspect of the invention, there is provided an image reading device including: a document stand at which a document can be fixed; a document transport unit which transports a document which is placed on a placing table on a path which passes through a reading position; a carriage which includes a reading unit, and can move in a reading range in which a document fixed at the document stand can be read using the reading unit, and a movement range including the reading position; a movement driving unit which moves the carriage; and a control unit which controls the document transport unit, the reading unit, and the movement driving unit. The control unit performs a reading operation in a first mode in which a document fixed at the document stand is read using the reading unit by moving the carriage in the reading range, and the carriage returns to a first standby position, and a second mode in which the document which is transported using the document transport unit is read using the reading unit in a state in which the carriage is stopped in the reading position, and the carriage stops in a second standby position. In addition, a first white reference body and a second white reference body for a shading correction are included in the image reading device, and the first white reference body is arranged in a position which is closer to the first standby position than the second white reference body, and the second white reference body is arranged in a position which is closer to the second standby position than the first white reference body. When the white reference body is read using the reading unit before a reading operation in the second mode, the control unit causes the carriage to read the second white reference body when the carriage is in the second standby position, and causes the carriage to read the first white reference body when the carriage is in the first standby position.

According to the configuration, when it is necessary to read the white reference body before a reading operation in the second mode, the second white reference body which is located in a position closer than the first white reference body is read when the carriage is in the second standby position, and the first white reference body which is located in a position closer than the second white reference body is read when the carriage is in the first standby position. Accordingly, it is possible to start a reading operation relatively early by rapidly reading the white reference body.

In the image reading device, it is preferable that a storage unit which stores position information which denotes a standby position of the carriage after a reading operation is included, and the control unit updates position information of the carriage after finishing reading operations of the carriage in the first and second modes.

According to the configuration, since position information of the carriage is updated after finishing the reading operations of the carriage in the first and second modes, it is possible to ascertain a standby position of the carriage from the position information when the position information is obtained at a time of receiving the subsequent reading request.

In the image reading device, it is preferable that a home seeking operation in which the carriage seeks a home position is performed when at least at a time of power on, and when a first reading operation after the home seeking operation is the second mode, reading of one of the first white reference body and the second white reference body corresponding to a standby position of the carriage after the home seeking operation is performed.

According to the configuration, one of the first white reference body and the second white reference body which is closer to a standby position after the home seeking operation is read, even in a case in which a reading operation (for example, job) is performed in the second mode after the home seeking operation of the carriage at least at a time of power on. Accordingly, it is possible to rapidly read the white reference body, and to make a standby time from a point of ending time of the home seeking operation to a start of a reading operation in the second mode relatively short.

According to another aspect of the invention, there is provided an image reading device including: a document stand at which a document can be fixed; a document transport unit which transports a document which is placed on a placing table on a path which passes through a reading position; a carriage which includes a reading unit, and can move in a reading range in which a document fixed at the document stand can be read, and a movement range including the reading position; a movement driving unit which moves the carriage; and a control unit which controls the document transport unit, the reading unit, and the movement driving unit. The control unit performs a reading operation in a first mode in which a document fixed at the document stand is read using the reading unit by moving the carriage in the reading range, and the carriage returns to a first standby position, and a second mode in which an image of a document which is transported using the document transport unit is read using the reading unit in a state in which the carriage is stopped in the reading position, and the carriage stops at a second standby position. In addition, a first white reference body which is located in a range from the first standby position to a position which is extended to the reading range, a second white reference body which is arranged at a position closer to the reading position than the first white reference body, a first sensor which detects that a document is set in the document stand, and a second sensor which detects that a document is set in the placing table are included in the control unit. The control unit causes the first white reference body to be read in a case where the first sensor enters a detecting state, causes the second white reference body to be read when the carriage is at the reading position, and causes the first white reference body to be read when the carriage is at the first standby position in a case where the second sensor enters a detecting state.

According to the configuration, when the first sensor detects that a document is set on the document stand, the first white reference body is read even before a reading request is received (for example, before receiving job). Meanwhile, when the second sensor detects that a document is set on the placing table even before a reading request is received (for example, before receiving job), the carriage is caused to read the second white reference body when the carriage is in the second standby position, and carriage is caused to read the first white reference body when the carriage is in the first standby position. Accordingly, it is possible to rapidly finish reading of the white reference body after detecting setting of a document, and to rapidly start a reading operation of a document after receiving a reading request.

In the image reading device, it is preferable that the control unit recognizes detecting order of the first sensor and the second sensor, and a reading operation is performed in a mode corresponding to one of the first sensor and the second sensor which is lastly detected, when both the first sensor and the second sensor enter a detecting state.

According to the configuration, when documents are placed on both of the placing table of the document transport unit and the document stand, a document which is lastly set is read. For example, even when a document which is read in the first mode in the previous time is not taken out from the document stand, a document is set on the placing table thereafter, and both of the sensors enter a detecting state, reading of the document which is placed on the placing table is started. For this reason, it is possible to perform reading of a document which is intended by a user.

In the image reading device, it is preferable that a first transparent member which configures the document stand, a second transparent member which is at a reading position in the second mode, and a support unit which supports the first transparent member and the second transparent member are included, and when the carriage moves in a range between the first transparent member and the second transparent member, a speed of the carriage which moves in a section between the first transparent member and the second transparent member is lower than a speed of the carriage which moves in another section.

According to the configuration, when the carriage moves the range between the first transparent member and the second transparent member, a speed of the carriage moving in the section between the first transparent member and the second transparent member is relatively low; however, it is not necessary for the carriage to move in a low-speed section between the first transparent member and the second transparent member when the carriage moves from the second standby position to the second white reference body in the second mode. Accordingly, it is possible to rapidly finish reading of the white reference body, and to start a reading operation early.

In the image reading device, it is preferable that the first standby position is a first white reference reading position in which the reading unit can read the first white reference body, and the second standby position is a reading position in which the reading unit can read a document in the second mode, or a second white reference reading position in which the reading unit can read the second white reference body.

According to the configuration, when it is necessary to read a white reference body before a reading operation in the second mode, if the carriage is at the second standby position, it is possible to read the white reference body in the position, or to read the document in the second mode in the position. In addition, when the carriage is in the first standby position, it is possible to read the white reference body in the position. Accordingly, when it is not necessary for the carriage to move to a reading position of the white reference body from the standby position, or the white reference body is not read, since a document can be read in the position, it is possible to start a reading operation of a document relatively early, after receiving a reading request.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment in which an image reading device is embodied will be described with reference to drawings.

The image reading device according to the first embodiment is a flat head-type scanner which configures a part of a multifunction printer, for example.

Figure 1:
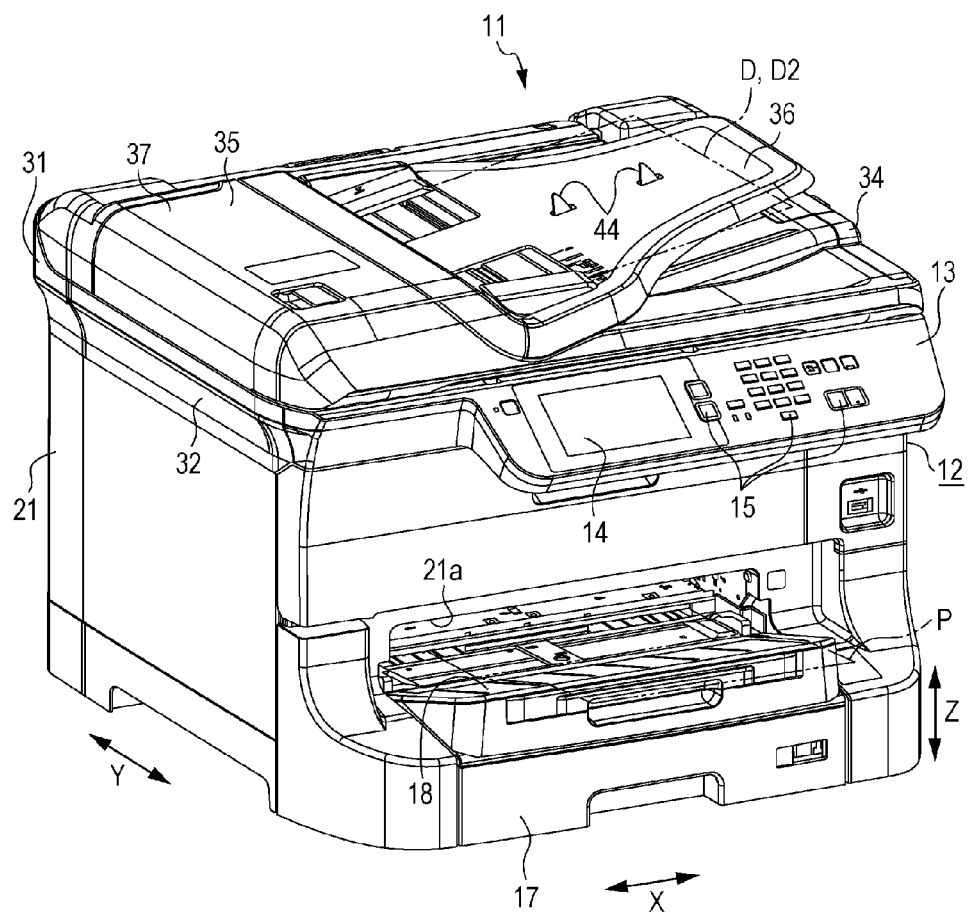
FIG. 1 is a perspective view of a multifunction printer according to a first embodiment.

As illustrated in FIG. 1, a multifunction printer 11 includes a printing device 21 which performs printing on a medium P such as a sheet, and an image reading device 31 which is arranged on a higher side of the printing device 21 in the vertical direction Z.

An operation panel 13 which is provided in an apparatus main body 12 of the multifunction printer 11 includes an operation unit 15 which is formed of a display unit 14 for displaying a menu screen, or the like, an operation switch, and the like. For example, a scanning request is applied to the multifunction printer 11 by operating the operation unit 15. In addition, it is possible to provide a scanning request to the multifunction printer 11 from a host device which is formed of a personal computer (PC) which is connected to the multifunction printer 11 through a communication cable. The scanning request is provided as a scanning job.

The printing device 21 performs printing on a medium P which is sent from a cassette 17 which is mounted on a lower part of the apparatus main body 12. The printed medium P is discharged to a discharging port 21a of the apparatus main body 12 or onto a stacker 18. The multifunction printer 11 has a scanning function and a copying function. Copying is performed when an image based on image data of a document, and which is read using the image reading device 31 is printed on the medium P using the printing device 21.

As illustrated in FIG. 1, the image reading device 31 includes a device main body 32 which includes a flatbed-type document stand 33 (refer to FIG. 2) which can fix a document on a higher part thereof, and a document stand cover 34 which is capable of opening or closing a face portion of the device main body 32 at which the document stand 33 is present. In addition, in the embodiment, an automatic document transport unit 35 (Auto Document Feeder; ADF) (hereinafter, simply referred to as "document transport unit 35") is mounted on a rear face portion (a portion opposite to the document stand 33 side) of the document stand cover 34. The document transport unit 35 includes a placing table 36 (setting tray) on which a plurality of documents D can be set, and a transport mechanism unit 37 which transports the documents D on the placing table 36 one by one. The transport mechanism unit 37 performs sending in of the document on the placing table 36 to a reading position, and transporting including discharging in which the document of which an image is read is sent out. The document D of which the image is read is sequentially discharged to a discharging region between the placing table 36 and the document stand cover 34, for example.

Figure 2:
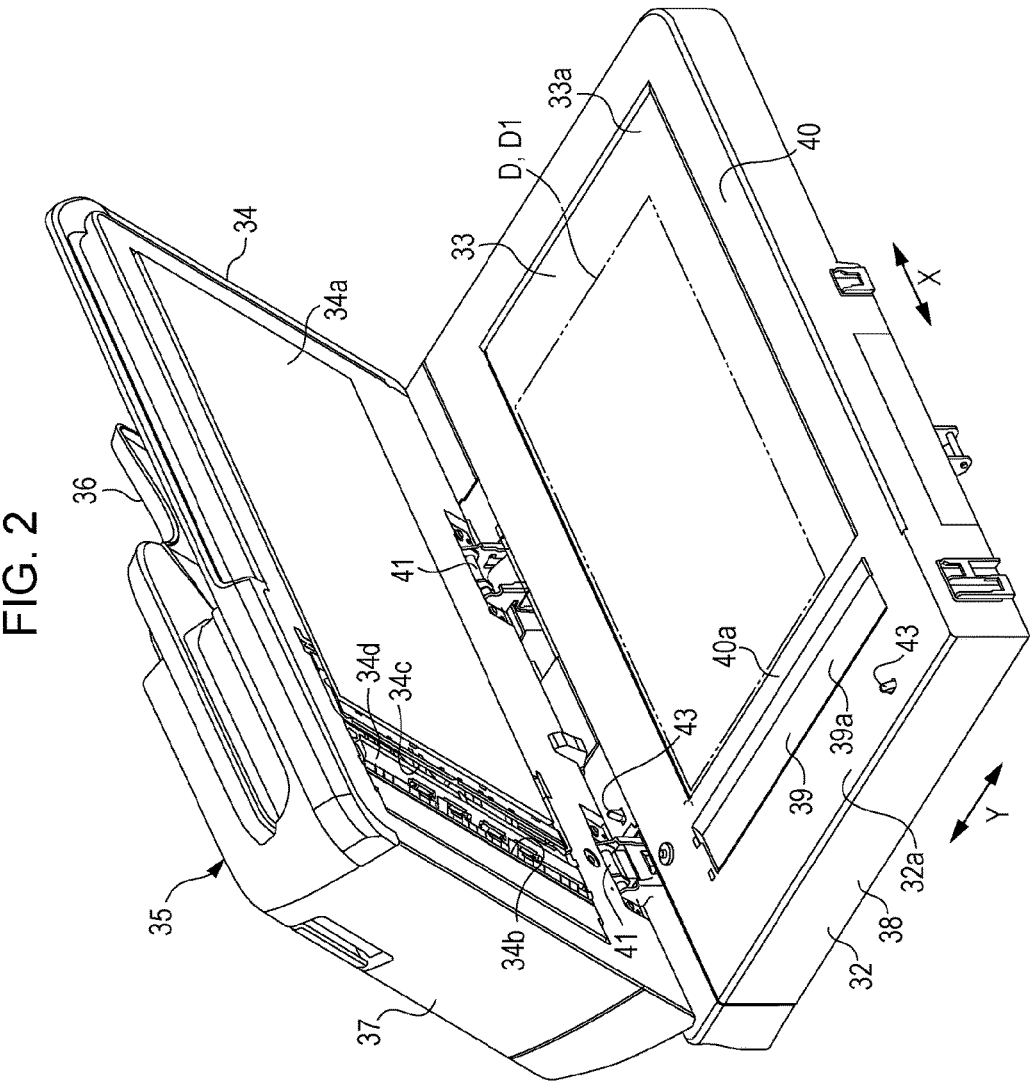
FIG. 2 is a perspective view of an image reading device in a state in which a document stand cover is open.

As illustrated in FIG. 2, the image reading device 31 includes a box shaped case 38 which has an opening portion on a higher side, the document stand 33 which is formed by fitting rectangular plate-shaped large glass 33a into a large opening portion of a frame portion 40 which configures a top face portion of the case 38, and a reading window 39 which is formed by fitting long rectangular plate-shaped small glass 39a into a small opening portion of the frame portion 40. The document stand 33 is a region at which a document which is read using a flatbed system is fixed, and has a size which is slightly larger than a maximum size of a document which can be read using the image reading device 31. In addition, according to the embodiment, an example of a first transparent member is configured by the large glass 33a which configures the document stand 33, and an example of a second transparent member is configured by the small glass 39a which configures the reading window 39. In addition, a material of the first and second transparent members is not limited to transparent glass, and may be a transparent resin material, or a transparent ceramic material other than glass.

The length of the reading window 39 in the longitudinal direction of the apparatus main body 12, that is, in the sub-scanning direction X (horizontal direction in FIG. 2) is sufficiently shorter than the length of the document stand 33. In addition, the reading window 39 is arranged at one side of the document stand 33 (left side in FIG. 2) in the longitudinal direction of the apparatus main body 12. In addition, the reading window 39 is located at a reading position in which an image of a document which is transported from the document transport unit 35 is read. The frame portion 40 has a long rectangular-shaped partitioning portion 40a which is extended along the main scanning direction Y between the document stand 33 and the reading window 39. That is, the document stand 33 and the reading window 39 are partitioned therebetween by the partitioning portion 40a.

The document stand cover 34 is rotatably attached through a hinge 41 which is provided on the rear face side of the device main body 32. For this reason, the document stand cover 34 can be set to a closed state in which a document D1 which is fixed at the document stand 33 is pressed, and an open state in which a document is set on the document stand 33, or a document which is read is removed. A white plate 34a which is slightly larger than the document stand 33 is provided on a face facing the document stand 33 (rear face) of the document stand cover 34. Since the document D1 which is fixed at the document stand 33 is pressed by the white plate 34a, the white plate 34a is read in a region on the document stand 33 in which the document D1 is not present.

A document which is sent into the transport mechanism unit 37 using the document transport unit 35 is sent onto the reading window 39 from a carrying-in port 34b which is open to a position approximately facing the reading window 39 on the rear face of the document stand cover 34 which is in a closed state, enters a carrying-out port 34c, and is discharged to a discharging region after an image thereof is read on the reading window 39. At this time, since the document is pressed to the reading window 39 side due to a long guide unit 34d extending in the scanning direction X, it is possible to read a relatively high quality image of the document which is in the middle of being transported.

In this manner, the image reading device 31 according to the embodiment is operated in two modes of a flatbed (FB) mode as an example of a first mode in which a document which is fixed at the flatbed-type document stand 33 is read, and an auto document feeder (ADF) mode as an example of a second mode in which a document transported in a path which passes through the reading window 39 from the placing table 36 using the document transport unit 35 is read at a position of the reading window 39 which is a position in the middle of transporting.

A first sensor 43 which detects closing of the document stand cover 34 is provided on a top face 32a of the device main body 32. The first sensor 43 enters a detecting state when the document stand cover 34 is in a closed state, and enters a non-detecting state when the document stand cover 34 is not in a closed state. In addition, as illustrated in FIG. 1, a second sensor 44 which can detect a set document is provided in the placing table 36 of the document transport unit 35. In the embodiment, the first sensor 43 and the second sensor 44 are configured of a contact type sensor which include a movable unit which is urged in a direction of protruding to the outer side (antigravity direction side), and detects a document and the document stand cover 34, respectively, when the movable unit is pushed in. In addition, at least any one of the first sensor 43 and the second sensor 44 can be set to a non-contact type sensor such as an optical sensor, for example.

Figure 3:
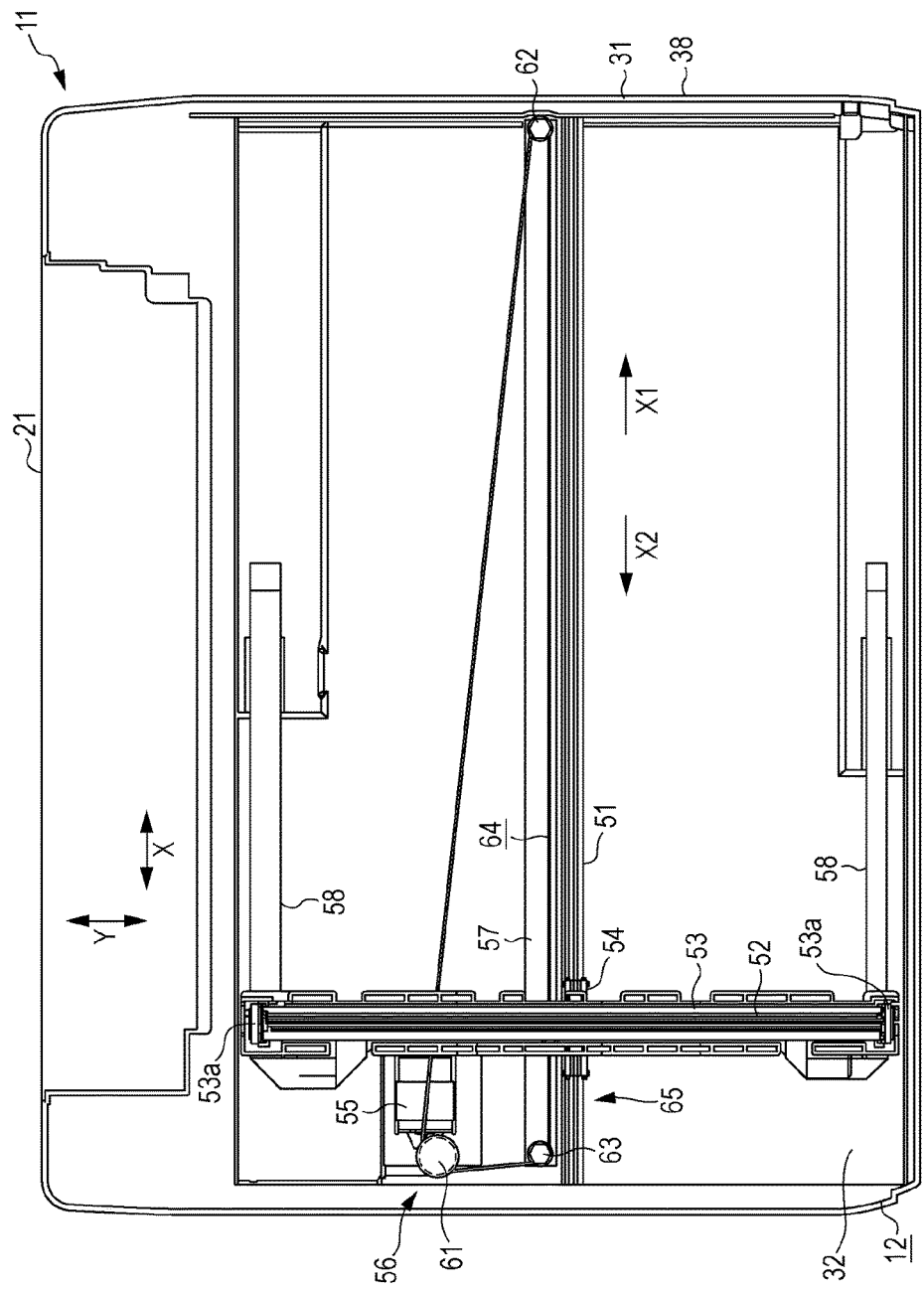
FIG. 3 is a plan view which illustrates an internal configuration of the image reading device.
Figure 4:
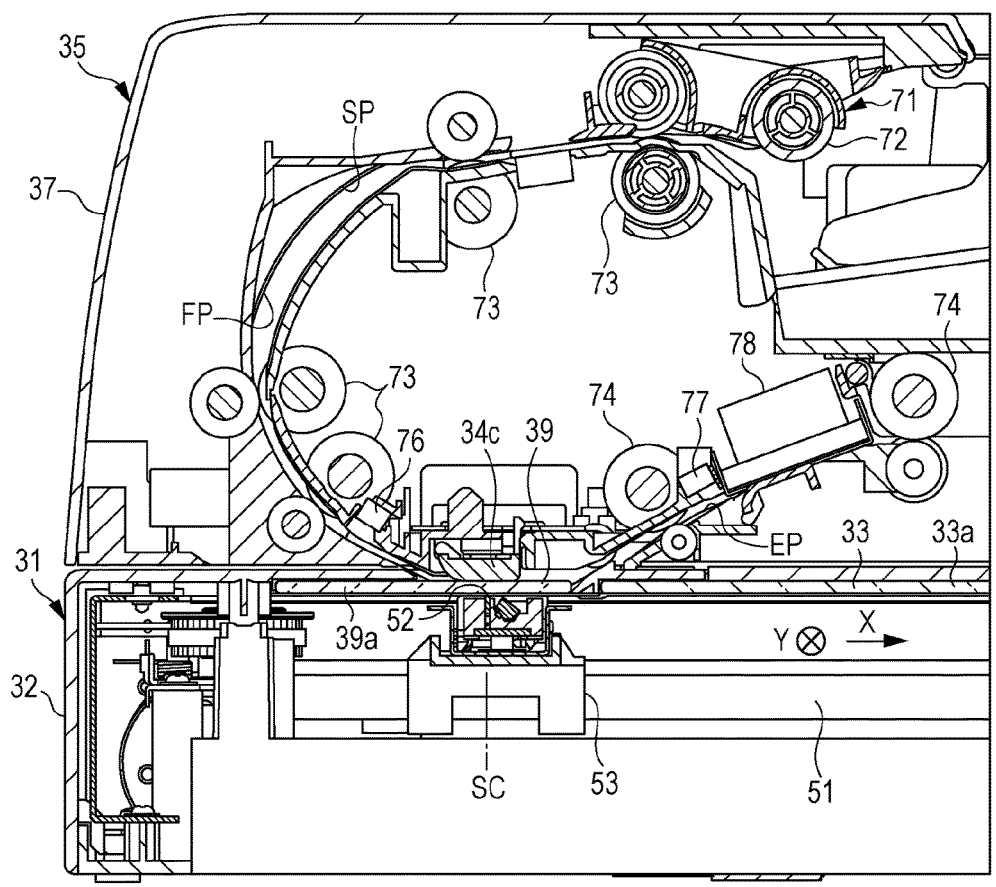
FIG. 4 is a partial side sectional view which illustrates a schematic configuration of the image reading device.

As illustrated in FIGS. 3 and 4, a guide rail 51 which is extended along the longitudinal direction (sub-scanning direction X) of the device main body 32 is arranged in the case 38. In addition, a sensing carriage 53 (hereinafter, simply referred to as "carriage 53") which includes a reading portion 52 is supported by the guide rail 51 through an engaging unit 54 in the case 38. The reading portion 52 is configured of an image sensor which configures a reading line in which a document is read along the main scanning direction Y which intersects the sub-scanning direction X. In particular, according to the embodiment, as an example of the image sensor, a contact type image sensor (Contact Image Sensor (CIS)) is used.

The carriage 53 reads the document D1 which is placed on the document stand 33 using the reading portion 52 by moving in the sub-scanning direction X along the guide rail 51. In the embodiment, the sub-scanning direction X is a direction intersecting both the vertical direction Z and the main scanning direction Y. In addition, it is also possible to use a charge coupled device (CCD) image sensor, for example, as the image sensor.

As illustrated in FIG. 3, a first motor 55 (electric motor) which is a power source which moves the carriage 53 in the sub-scanning direction X, and a power transmission mechanism 56 which transmits a power of the first motor 55 to the carriage 53 are accommodated in the case 38. In addition, when the first motor 55 performs normal rotation driving, the carriage 53 moves (outward movement) in an outward movement direction X1 (right-hand direction in FIG. 3) in the sub-scanning direction X, and when the first motor 55 performs a reverse rotation driving, the carriage 53 moves (return movement) in a return movement direction X2 (left-hand direction in FIG. 3).

An end portion of a pair of flexible cables 58 which is extended in the sub-scanning direction X is connected to both end portions of the carriage 53 in the main scanning direction Y. The other end portion of the flexible cable 58 (base end portion) is fixed to a base portion near a center of the case 38 in the sub-scanning direction X. The flexible cable 58 includes a plurality of electric wires, or the like, for sending a control signal to the first motor 55 or the reading portion 52 from a control unit 90 (refer to FIG. 9) which is accommodated in the apparatus main body 12, or sending read data of the reading portion 52 to the control unit 90.

The power transmission mechanism 56 includes a driving pulley 61 which rotates using a power of the motor 55, two driven pulleys 62 and 63 which are arranged at both ends of a sheet metal member 57 which is extended along the guide rail 51, and an endless belt 64 which is wound around each of the pulleys 61 to 63, and tows the carriage 53. The belt 64 is stretched in appropriately a triangular shape in a planar view by being wound around the three pulleys 61 to 63.

The carriage 53 is fixed to a portion which is stretched in the sub-scanning direction X in a state of being parallel to the guide rail 51 between two driven pulleys 62 and 63 with respect to the belt 64. In addition, if the first motor 55 is driven, the carriage 53 moves along the sub-scanning direction X, when the belt 64 performs a circulating movement due to a rotation of the driven pulley 61. In addition, tilting of the carriage 53 in the vertical direction Z is suppressed when protecting units 53a which are provided at both end portions in the main scanning direction Y come into contact with the lower face of the document stand 33 or the frame portion 40 which is illustrated in FIG. 3. Here, a configuration in which the belt 64 is set to a toothed belt, each of the pulleys 61 to 63 is set to a toothed pulley, and the belt 64 is wound around each of the pulleys 61 to 63 in a state of being engaged with each other may be adopted. A path in which the belt 64 is stretched is not limited to the approximately triangular shape in a planar view, and may be a rectangular shape or a linear shape. According to the embodiment, a movement driving unit 65 which moves the carriage 53 in the sub-scanning direction X is configured of the guide rail 51, the motor 55, the power transmission mechanism 56, the pulleys 61 to 63, the belt 64, and the like.

On the other hand, the document transport unit 35 which is illustrated in FIG. 4 includes a sending roller 72 which configures a part of a sending mechanism 71 which sends a document from the placing table 36 to a transport path FP side in a transport mechanism unit 37, and a plurality of pair of sending rollers 73 which are provided along a sending path SP so as to transport the document which is sent using the sending roller 72 to a reading position SC. In addition, the document which is sent using the plurality of pair of sending rollers 73 is read in the middle of transporting using the reading portion 52 of the carriage 53 which is located at the reading position SC. The read document is discharged from the transport mechanism unit 37 using a plurality pair of discharging rollers 74 which are provided along a discharging path EP to the outside. A long guide unit 34d which guides the document along the front surface of the reading window 39 (small glass 39a) is arranged in a state of being extended along the main scanning direction Y in the reading position SC. In this manner, in the ADF mode, the plurality of documents which are set on the placing table 36 are separated one by one, are transported in a path which passes through the reading position SC through the transport path FP which is formed in the transport mechanism unit 37, and the document which is being transported are read using the reading portion 52 of the carriage 53 which stops at the reading position SC. The transport path FP is configured of a feeding path SP on which a document is fed from the placing table 36 to the reading position SC, and a discharging path EP on which the document is discharged from the reading position SC to the discharging region in the outside.

As illustrated in FIG. 4, a first detection unit 76 which can detect the document which is being sent in the sending path SP in a position on the side further upstream than the reading position SC in the transport direction, and a second detection unit 77 which can detect the document which is being discharged in a position on the side further downstream than the reading position SC in the transport direction are provided in the transport mechanism unit 37. In addition, a reading unit 78 which can read a face on the side (rear surface) opposite to a reading face (front surface) of a document using the reading portion 52 in the middle of the discharging path EP is arranged at a position on the side further downstream side than the second detection unit 77 in the transport direction. For this reason, the image reading device 31 can also read both faces of a document in the ADF mode.

The carriage 53 reciprocates along the guide rail 51 in the sub-scanning direction X on the lower part of arranging regions of the large glass 33a which configures the document stand 33, and the small glass 39a which configures the reading window 39. At this time, the reading portion 52 performs a reciprocating movement in the sub-scanning direction X along with the carriage 53 while maintaining a state of facing each of glass 33a and 39a.

As illustrated in FIG. 4, the carriage 53 is arranged at the reading position SC in which the reading portion 52 faces the reading window 39 in the ADF mode. In addition, the reading portion 52 reads a document which is in the middle of being transported at a constant speed while being guided along a glass face between the small glass 39a of the reading window 39 and the long guide unit 34d through the small glass 39a.

Figure 7:
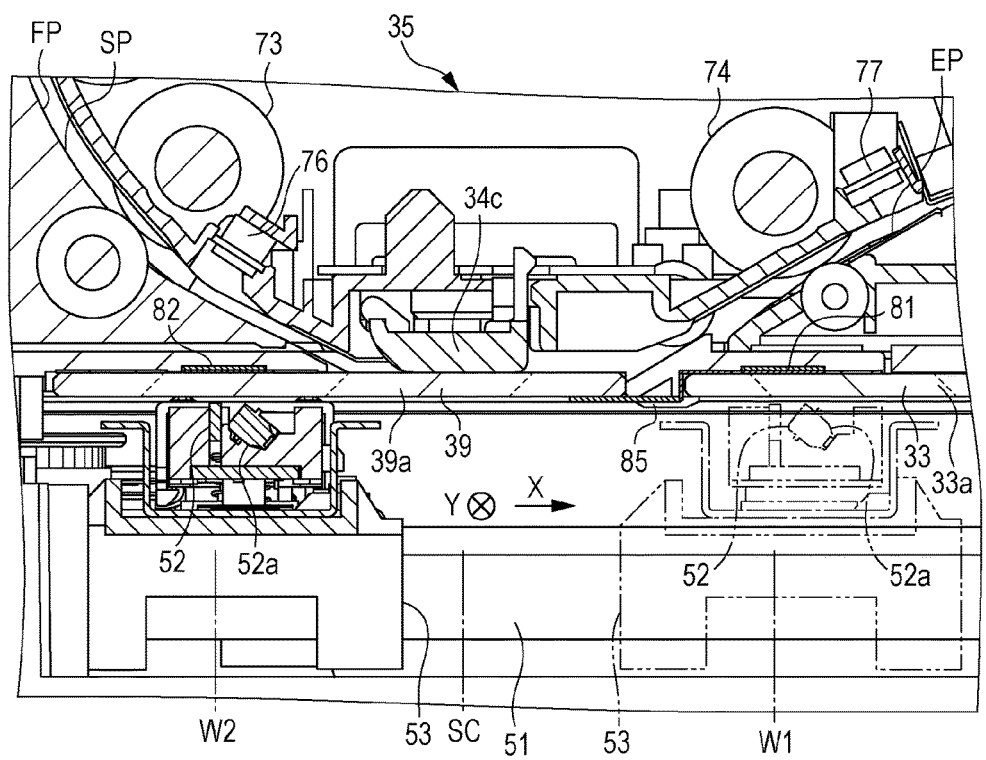
FIG. 7 is a partial side sectional view which illustrates a schematic configuration of the image reading device.

In addition, as illustrated in FIG. 7, the carriage 53 includes a light source 52a in the vicinity of the reading portion 52, and the reading portion 52 reads an image of a document when the reading portion 52 receives reflected light which is obtained when light radiated from the light source 52a is reflected on the document.

As illustrated in FIG. 7, two white reference plates 81 and 82 which have uniform reflecting faces with high reflectivity on the top face portion of the device main body 32 are arranged at positions which can be read using the reading portion 52 on the movement path of the carriage 53. The first white reference plate 81 and the second white reference plate 82 are set to be reading targets when obtaining white reference data which is used in a shading correction. The first white reference plate 81 and the second white reference plate 82 are read using the reading portion 52 when execution conditions for reading white reference which prescribe that reading of the white reference plate is necessary are established.

The first white reference plate 81 is read when execution conditions for reading white reference are established when performing a reading operation (scanning operation) of a document in the FB mode, and is arranged at a position between the document stand 33 and the reading window 39 in the sub-scanning direction X. Specifically, the first white reference plate 81 is arranged on a top face of an end portion of the large glass 33a which is extended to the outer side (reciprocating direction X2 side) of the document stand 33.

On the other hand, the second white reference plate 82 is read before a reading operation when execution conditions for reading white reference are established, at a time of performing a reading operation in the ADF mode, and is arranged in a position on the reciprocating direction X2 side compared to the reading window 39. Specifically, as illustrated in FIG. 7, the second white reference plate 82 is arranged on a top face of an end portion of the small glass 39a which is extended to the outer side (reciprocating direction X2 side) of the reading window 39.

In this manner, according to the embodiment, both the first white reference plate 81 and the second white reference plate 82 are located out of the transport path. Here, the first white reference plate 81 and the second white reference plate 82 are not to limited to the plate shape, and may be a columnar shape which is thicker than the plate shape, or a film shape (for example, coating film) which is thin. In addition, according to the embodiment, an example of the first white reference body is configured by the first white reference plate 81, and an example of the second white reference body is configured by the second white reference plate 82.

Figure 5:
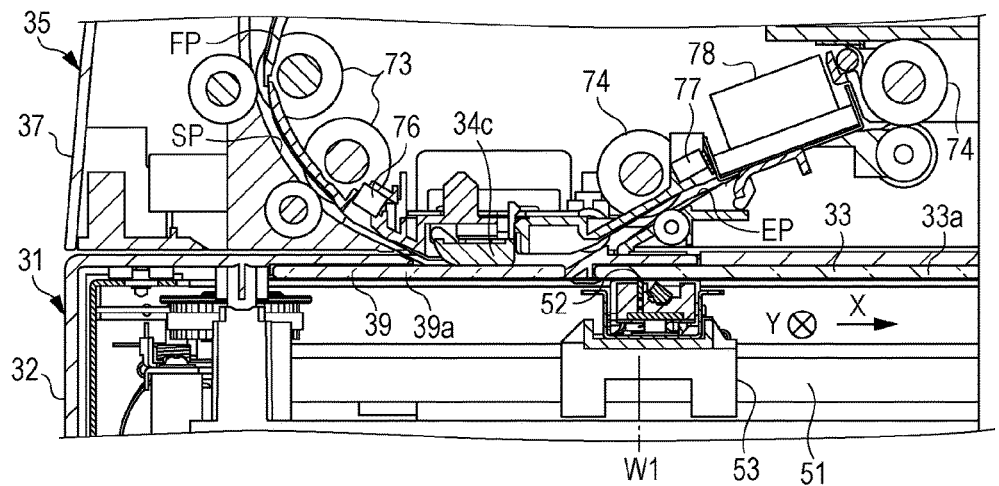
FIG. 5 is a partial side sectional view which illustrates a schematic configuration of the image reading device.
Figure 6:
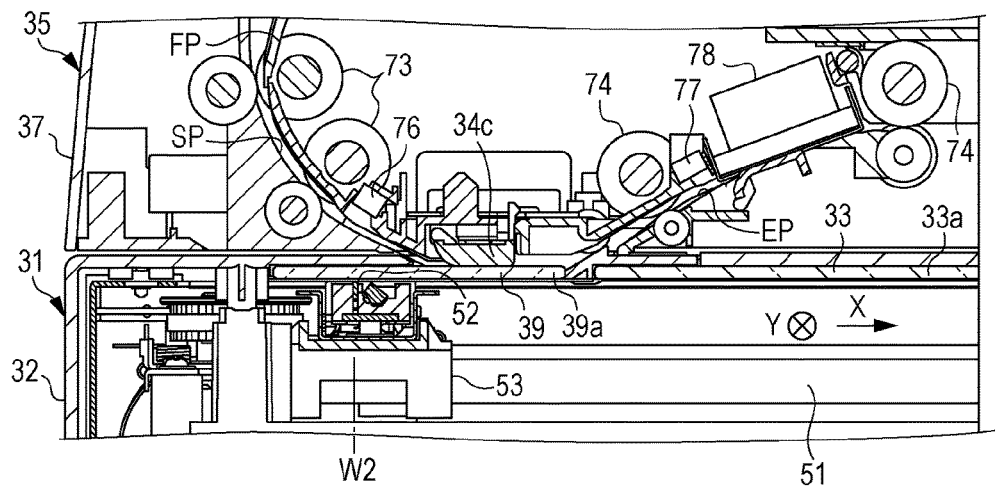
FIG. 6 is a partial side sectional view which illustrates a schematic configuration of the image reading device.

As illustrated in FIGS. 5 and 7, the carriage 53 is arranged at a first white reference reading position W1 when reading the first white reference plate 81. In addition, as illustrated in FIGS. 6 and 7, the carriage 53 is arranged at a second white reference reading position W2 when reading the second white reference plate 82. Here, a maximum resolution when reading a document in the FB mode is set to be higher than a maximum resolution when reading a document in the ADF mode. For this reason, the first white reference plate 81 for FB mode is read in a predetermined high resolution, and the second white reference plate 82 for ADF mode is read in a predetermined low resolution which is lower than the reading resolution of the first white reference plate 81.

Subsequently, a positional relationship among home positions HP1 and HP2 of the carriage 53 in each mode of two types, the reading position SC, and the first white reference plate 81 and the second white reference plate 82 will be described with reference to FIG. 8.

Figure 8:
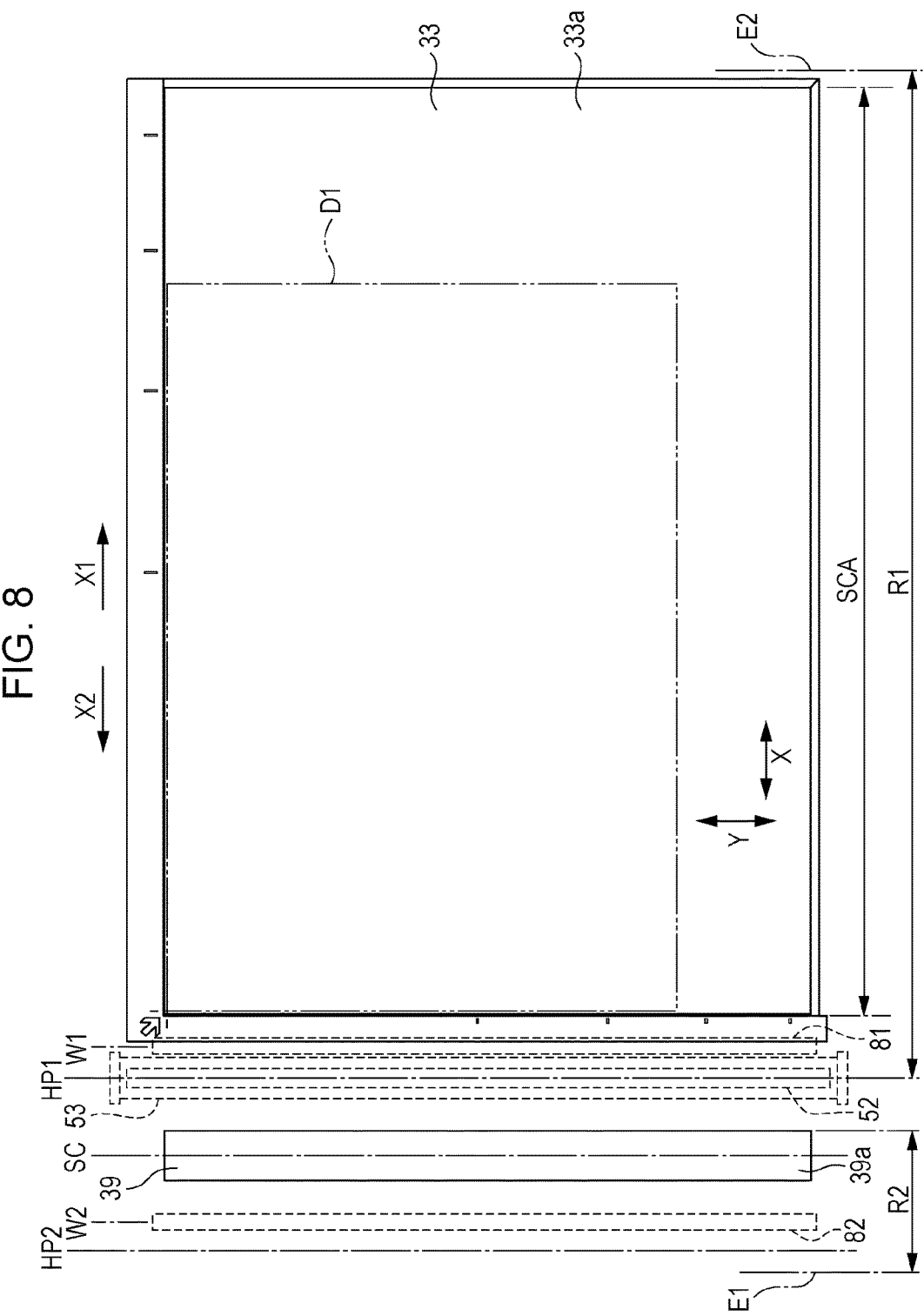
FIG. 8 is a schematic plan view which illustrates a moving position of a carriage in the image reading device.

As illustrated in FIG. 8, a position of an approximate center line in the width of the reading window 39 in the sub-scanning direction X is set to the reading position SC. In the ADF mode, the reading portion 52 performs reading of a document D which is transported in the reading position SC. In addition, an arranging region of the document stand 33 in the sub-scanning direction X is set to a reading range SCA. The reading range SCA is set to a size in which a document with an assumed maximum size can be read. In the FB mode, the carriage 53 reads a document D by scanning a range corresponding to a size of the document D in the sub-scanning direction X in a range of the reading range SCA. The carriage 53 moves in a movement range including the reading range SCA in which a document which is fixed at the document stand 33 can be read, and the reading position SC. That is, the carriage 53 can reciprocate in the movement range from a limit position E1 on the reciprocating direction X2 side to a limit position E2 on the reciprocating direction X1 side.

As illustrated in FIG. 8, according to the embodiment, home positions HP1 and HP2 of the carriage 53 in each mode of two types are set. That is, the home position HP1 for FB mode (hereinafter, also referred to as "first home position HP1") is set in a position of the document stand 33 other than the arranging region in a first region R1 which is the movement range of the carriage 53 in the FB mode. In addition, the home position HP2 for ADF mode (hereinafter, also referred to as "second home position HP2") is set in a position in a second region R2 which is a movement range of the carriage 53 in the ADF mode.

The home position is a reference position (origin position) of the carriage 53 which is sought in a home seeking operation (home position seeking operation) of the carriage 53 which is performed when power of the multifunction printer 11 is turned on. A home position in the vicinity corresponding to a position of the carriage 53 at a time of power on is sought in the home seeking operation. For this reason, the first home position HP1 and the second home position HP2 are set. The first home position HP1 is set in a position in a range between the reading window 39 and the document stand 33, and is set in a position of approximately at a center in the width of the range in the sub-scanning direction X, as an example.

In addition, the second home position HP2 is set to a position in a range between the limit position E1 and the reading window 39, and is set in a position between the limit position E1 and the second white reference plate 82, as an example.

In FIG. 8, the first region R1 from the first home position HP1 to the limit position E2 on the reciprocating direction X1 side is a maximum range in which the carriage 53 in a standby position in the FB mode can move at a time of the FB mode. In addition, the second region R2 from the limit position E1 to an end portion of the reading window 39 on the reciprocating direction X1 side is a maximum range in which the carriage 53 in a standby position in the ADF mode can move in the ADF mode.

As illustrated in FIG. 8, the first white reference plate 81 for FB mode is arranged in a position between the reading window 39 and the document stand 33. For this reason, the first white reference reading position W1 which is an arranging position of the carriage 53 when reading the first white reference plate 81 using the reading portion 52 is similarly set to a position between the reading window 39 and the document stand 33. In particular, the first white reference plate 81 is arranged in a position other than the arranging region of the document stand 33 in the first region R1. For this reason, in particular, the first white reference reading position W1 is set to a position other than the arranging region of the document stand 33 in the first region R1.

In addition, the first white reference plate 81 in the embodiment is arranged in a position between the first home position HP1 and the document stand 33. For this reason, the first white reference reading position W1 is set to a position between the first home position HP1 and the document stand 33. In addition, the first white reference plate 81 may be arranged in the first home position HP1.

The second white reference plate 82 for ADF mode is arranged in a position other than the arranging region of the reading window 39 in the second region R2. That is, the second white reference plate 82 is arranged in a position in a range from the limit position E1 to the end portion of the reading window 39 on the reciprocating direction X2 side. For this reason, the second white reference reading position W2 which is an arranging position which is an arranging position of the carriage 53 when reading the second white reference plate 82 using the reading portion 52 is similarly set to a position out of the arranging region of the reading window 39 in the second region R2. In particular, the second white reference plate 82 in the embodiment is arranged in a position which is the opposite side to the first white reference plate 81 in the carriage movement direction (sub-scanning direction X) by interposing the reading position SC therebetween. In particular, the second white reference plate 82 is arranged in a position on the reciprocating direction X2 side compared to the reading window 39. In the embodiment, particularly, the second white reference plate 82 is arranged in a position between the second home position HP2 and the reading window 39. For this reason, particularly, the second white reference reading position W2 in the embodiment is set to a position between the second home position HP2 and the reading window 39. The second white reference plate 82 may be arranged in the second home position HP2.

As illustrated in FIG. 8, a standby position to which the carriage 53 return after finishing the reading operation in the FB mode is set to a position in a range between the document stand 33 and the reading window 39 in the sub-scanning direction X. In the embodiment, the standby position in the FB mode (hereinafter, also referred to as "first standby position") is set to the first home position HP1 or the first white reference reading position W1 as an example.

In addition, a standby position of the carriage 53 after finishing the reading operation in the ADF mode is set to a position in the second region R2. In particular, the standby position in the ADF mode (hereinafter, also referred to as "second standby position") is set to a position in a range from the second home position HP2 to the reading position SC. In the embodiment, the second standby position is set to the reading position SC or the second white reference reading position W2 as an example. In addition, the second standby position may be the second home position HP2.

The second white reference plate 82 for ADF mode is arranged in a position which is closer to the second standby position than the first white reference plate 81 in the carriage movement direction (that is, sub-scanning direction X). In addition, a total movement distance which is denoted by a sum of a movement distance of the carriage 53 from the second standby position to the second white reference reading position W2 and a movement distance of the carriage 53 from the second white reference reading position W2 to the reading position SC is set so as to be shorter than the total movement distance of the carriage 53 from the second standby position to the reading position SC through the first white reference reading position W1.

For example, when modes of the reading operation in the previous time and this time are different, it is necessary for the carriage 53 to move between the first region R1 and the second region R2; however, in the embodiment, it is necessary to set a speed of the carriage to be low in a process in which the carriage 53 moves between the first region R1 (large glass 33a) and the second region R2 (small glass 39a) due to the following reason. A movement supporting unit 85 which supports a movement of the reading portion 52 when the reading unit moves between the second region R2 and the first region R1 which are illustrated in FIG. 7 is provided between the small glass 39a and the large glass 33a.

The movement supporting unit 85 has a function of pushing out the reading portion 52 to a direction (lower direction in FIG. 7) intersecting the lower face of the small glass 39a when the reading portion 52 is moved. Due to the pressing out function of the movement supporting unit 85, the reading portion 52 can move without being caught by an end face of the large glass 33a or an end face of the small glass 39a. The carriage 53 in the embodiment includes the pair of protection units 53a (refer to FIG. 3) at both end portions of the reading portion 52 on the longitudinal direction side, and the reading portion 52 can smoothly move between the first region R1 and the second region R2, that is between two positions of the large glass 33a and the small glass 39a, when the movement supporting unit 85 presses the top face of the pair of protection units 53a. However, when the reading portion 52 moves between the first region R1 and the second region R2, since the protection unit 53a comes into contact with the movement supporting unit 85, it is necessary to set a speed of the carriage to be low at least in the movement process (low speed movement region). For this reason, when the reading portion 52 moves between the first region R1 and the second region R2, it takes a relatively long moving time.

As illustrated in FIG. 7, the reading portion 52 moves beyond the movement supporting unit 85 when moving from the reading position SC in the ADF mode to the first white reference reading position W1 in the FB mode. For this reason, when a configuration of reading the first white reference plate 81 in the ADF mode is adopted, movements of reciprocating of two time in the low speed movement region including a process of the outward movement of the carriage, and a process of the return movement in which the carriage 53 moves to the reading position SC after reading the first white reference plate 81 are accompanied, and due to this, a necessary reading time of the white reference plate before starting the reading operation becomes long. Therefore, according to the embodiment, the second white reference plate 82 for ADF mode is provided in a position in the second region R2, and when it is necessary to read the white reference plate in the ADF mode, it is set so that the second white reference plate 82 in the second region R2 is read.

The second white reference plate 82 is arranged in a position which is the side opposite to the first white reference plate 81 by interposing the reading window 39 therebetween. For this reason, when the mode is switched from the FB mode to the ADF mode in the previous time and this time, a total movement distance of the carriage 53 which moves to the reading position SC after reading the first white reference plate 81 in the first standby position (for example, first white reference reading position W1) becomes short compared to a total movement distance of the carriage 53 which moves from the first standby position to the reading position SC through the second white reference reading position W2. For this reason, according to the embodiment, when the carriage 53 is at the standby position of the FB mode (first standby position) when performing a reading operation in the ADF mode, it is set so that the carriage 53 first reads the first white reference plate 81 in the standby position, and then moves to the reading position SC.

In order to meet the above described points, according to the embodiment, position information which denotes a current position of the carriage 53 when receiving a scanning request is obtained, and one of the two white reference plates 81 and 82 which will be a reading target is determined according to a current position (standby position) of the carriage 53 which is specified from the position information, and a mode which is requested in the scanning request. In this manner, it is possible to make a standby time from the scanning request to a start of the reading operation relatively short.

Here, according to the embodiment, a document is read using a first resolution in the FB mode; however, in contrast to this, a document is read using a second resolution which is lower than the first resolution in the ADF mode. For this reason, the reading portion 52 generates white reference data for high resolution by reading the first white reference plate 81 in a high resolution in the FB mode, and generates white reference data for low resolution by reading the second white reference plate 82 in a low resolution in the ADF mode. In this case, the white reference data for high resolution can be used in correction of read data in both the FB mode and the ADF mode. However, white reference data for low resolution can be used in correction of read data in the ADF mode; however, it is not used in correction of read data in the FB mode since it is basically not appropriate. The control unit 90, which will be described later, selects a white reference plate which can be a reading target between the two white reference plates 81 and 82 in consideration of the point, as well.

Figure 9:
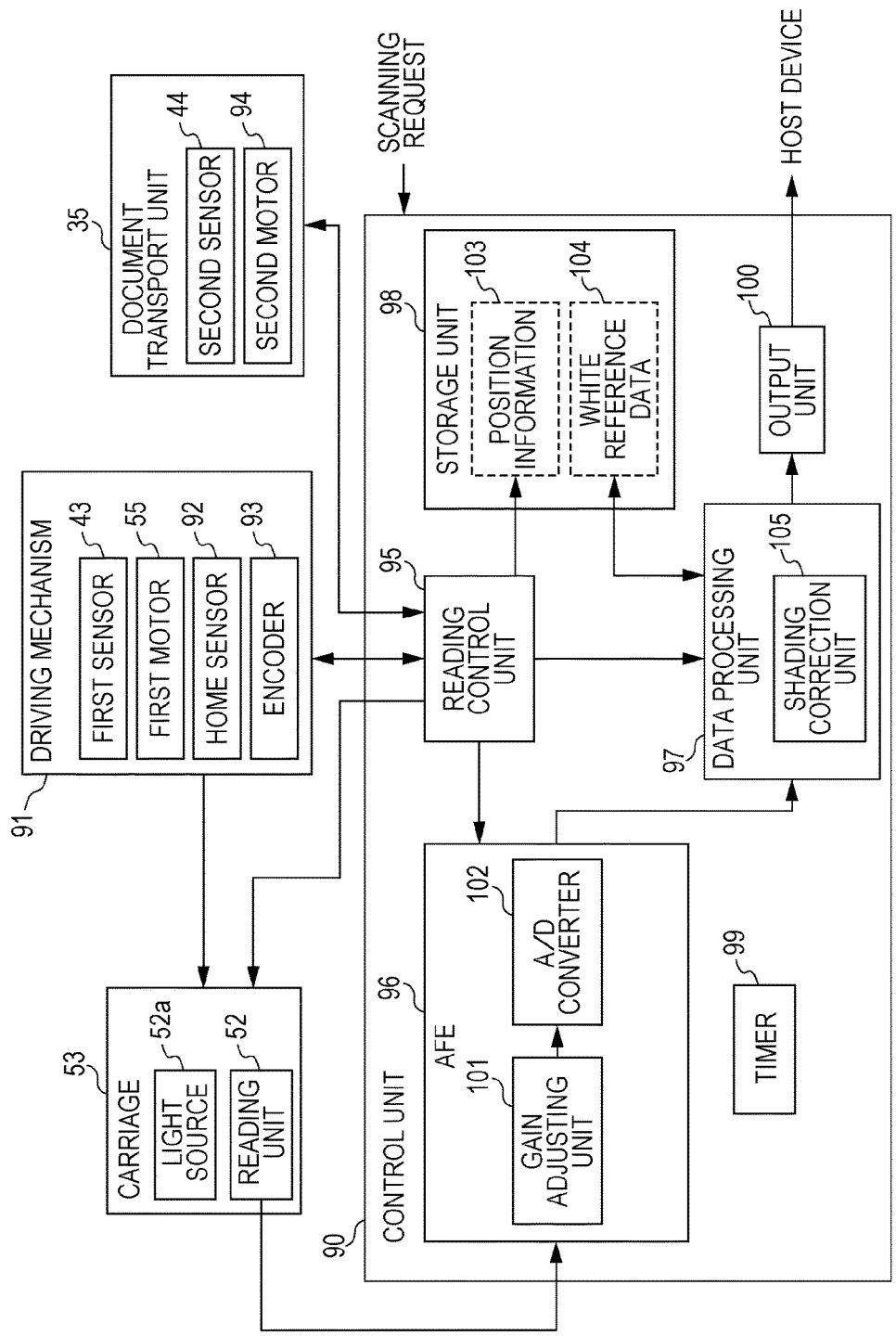
FIG. 9 is a block diagram which illustrates an electrical configuration of the image reading device.

Subsequently, an electrical configuration of the image reading device 31 will be described with reference to FIG. 9. In addition, FIG. 9 illustrates an electrical configuration which is related to a control of image reading, and a first detection unit 76, a second detection unit 77, a reading unit 78, and the like, in the document transport unit 35 are omitted.

The image reading device 31 is a flatbed-type image reading device which includes the document stand 33, and performs a reading operation in the FB mode in which an image of the document D1 which is placed on the document stand 33 is read using the reading portion 52 which is formed of an image sensor, and is included in the carriage 53. In addition, the image reading device 31 performs a reading operation in the ADF mode in which documents which are set in the placing table 36 of the document transport unit 35 are transported one by one, and are read in the reading position SC in the middle of the transport path.

In addition, the image reading device 31 determines one of the two white reference plates 81 and 82 which will be a reading target according to a position of the carriage (standby position), and a mode of requested scanning, when receiving the scanning request, and reads the determined white reference plate by causing the light source 52a to emit light (turning on). The light source 52a is formed of, for example, an LED. In addition, the light source 52a is not limited to the LED, and may be an electric bulb or a fluorescent lamp.

In a general shading correction, black reference data is also used; however, the image reading device 31 may not include a special mechanism for generating black reference data. When generating black reference data, the image reading device 31 generates black reference data by reading image data in a state in which light emitting of the light source 52a is stopped (turned off), for example.

The image reading device 31 includes the control unit 90 which is in charge of a control of the entire device, and performs various processes for reading an image, the carriage 53 on which the light source 52a, and the reading portion 52 are mounted, a driving mechanism 91 which controls a movement of the carriage 53, and the document transport unit 35.

The driving mechanism 91 includes a first sensor 43, the first motor 55, a home sensor 92, and an encoder 93. The first sensor 43 is a switch-type sensor which detects closing of the document stand cover 34, outputs a detection signal when the document stand cover 34 is in a closed state, and outputs a non-detection signal when the document stand cover 34 is not in a closed state.

The first motor 55 is a power source which moves the carriage 53, and is formed of a DC motor, for example. When the first motor 55 is driven, the carriage 53 moves in the sub-scanning direction X along with the light source 52a and the reading portion 52. In detail, when the first motor 55 is subjected to forward driving, the belt 64 orbits in the forward direction, and the carriage 53 moves in the forward direction X1. In addition, when the first motor 55 is subjected to reverse driving, the belt 64 orbits in the reverse direction, and the carriage 53 moves in the return direction X2.

For example, in the FB mode, when the carriage 53 moves in the forward direction X1 due to forward driving of the first motor 55, the document D1 on the document stand 33 (large glass 33a) is read using the reading portion 52 which moves forward along with the carriage. In addition, when the reading operation is finished, the first motor 55 is subjected to reverse driving, and the carriage 53 returns to a standby position in the FB mode (first home position HP1, or first white reference reading position W1).

The home sensor 92 detects that the carriage 53 is at the home position. In the embodiment, the image reading device 31 performs a home seeking operation of seeking a home position of the carriage 53 at least at a time of power on. In the embodiment, there are the first home position HP1 and the second home position HP2, and the home sensor 92 detects that the carriage 53 is at the first home position HP1, and the reading portion 52 detects that the carriage 53 is at the second home position HP2 by reading a mark (not illustrated). When the home sensor 92 is switched from a non-detecting state to a detecting state in the middle of a home seeking operation of the carriage 53, a position of the carriage at the time is set to the first home position HP1. In addition, when the reading portion 52 reads mark (not illustrated) in the middle of the home seeking operation of the carriage 53, a position of the carriage at the time is set to the second home position HP2.

When a reading operation which is firstly performed after the home seeking operation is an operation in the ADF mode, the control unit 90 reads one of the first white reference plate 81 and the second white reference plate 82 which is closer to a standby position at the time according to the standby position of the carriage 53 after finishing the home seeking operation. That is, when a standby position of the carriage 53 after finishing the home seeking operation is the first home position HP1, the first white reference plate 81 is read, and when a standby position of the carriage 53 after finishing the home seeking operation is the reading position SC, the second white reference plate 82 is read.

The encoder 93 outputs the number of encoder pulses which is proportional to a rotation speed of the first motor 55 per unit hour, that is, a movement speed of the carriage 53. The first motor 55 is controlled based on an output value of the encoder 93 which outputs encoder pulses.

Specifically, the control unit 90 is embedded with a counter (not illustrated) which counts, for example, a pulse edge of the encoder pulse which is input from the encoder 93. When the home sensor 92 enters a detecting state as a result of home seeking operation in which a home position of the carriage 53 in the sub-scanning direction X is sought, the counter is reset. In addition, the control unit 90 determines whether a movement direction of the carriage 53 is a forward direction or a return direction by comparing levels of a plurality of types of encoder pulses of which phases are different, and which are input from the encoder 93. The counter counts a pulse edge of an encoder pulse which is input after resetting, increases a count value at the time by "1" at a forwarding time of the carriage 53, and decreases a count value by "1" at a returning time of the carriage 53. In this manner, a count value which denotes a position of the carriage 53 in the sub-scanning direction X is counted in the counter. The control unit 90 performs a position control in which the carriage 53 stops at a predetermined target position by controlling the first motor 55 while monitoring a count value of the counter. In addition, the control unit 90 ascertains a movement speed of the carriage 53 from a changing amount in a count value (that is, the number of pulse edges) per unit hour using the counter, and causes the carriage 53 to perform scanning in the sub-scanning direction X at a constant speed at a time of a reading operation (scanning operation) of a document.

The light source 52a irradiates a document D which is read using the reading portion 52 with light. The light source 52a in the embodiment is configured of a red LED, a green LED, and a blue LED since the light source performs color scanning, and generates light of three colors of RGB in predetermined order. According to the embodiment, the light source 52a generates light in order of the red LED, the green LED, and the blue LED when performing reading of white reference plates 81 and 82 of one line. In addition, since reading of white reference plates 81 and 82 of a couple of lines is performed, a similar light emitting operation is repeated. A LED light emitting time of each color is predetermined in each color, and is turned off when the predetermined time elapses after turning on. In addition, light emitting order is not limited to the order of RGB, and can be appropriately changed.

The reading portion 52 receives light which is radiated from the light source 52a, is reflected on a document D, and is condensed in a lens (not illustrated), accumulates a charge corresponding to a light intensity, and sends to the control unit 90 as image reading data (electric signal) which is formed of analog data. The reading portion 52 is formed of a plurality of sensor chips (not illustrated) which are aligned in the main scanning direction Y.

The document transport unit 35 includes a second sensor 44 and a second motor 94. The second sensor 44 is a switch-type sensor which detects a document which is set on the placing table 36 of the document transport unit 35, outputs a detection signal when detecting that a document is set on the placing table 36, and outputs a non-detection signal when a document is not set on the placing table 36.

The second motor 94 is a power source which drives the document transport unit 35, and is configured of a DC motor, for example. When the second motor 94 is driven, a sending roller 72, a pair of sending rollers 73, and a pair of discharging rollers 74 perform rotational driving, documents D2 which are set on the placing table 36 are transported in order one by one on a path which passes through the reading position SC, and are discharged to a discharging region between the document stand cover 34 and the placing table 36.

The control unit 90 entirely controls each functional unit in the control unit 90, and includes a reading control unit 95 which controls the light source 52a in the carriage 53, the reading portion 52, the driving mechanism 91, and the document transport unit 35. In addition, the control unit 90 includes an AFE 96 which performs analog processing such as converting of analog data which is output from the reading portion 52 into digital data, a data processing unit 97 which performs various corrections with respect to the digital data which is output from the AFE 96, and a storage unit 98 which stores the digital data for performing various corrections using the data processing unit 97. In addition, the control unit 90 includes a timer 99 which counts an elapsed time in order to obtain a timing in which the multifunction printer 11 transfers to a power saving mode, an output unit 100 for sending data from the data processing unit 97 to a host device such as a personal computer, and the like. The control unit 90 counts an elapsed time after a state in which any work or operation is not performed in the multifunction printer 11 using the timer 99, and causes the multifunction printer to transfer to a power saving mode when the counted elapsed time reaches a set time for power saving.

The AFE 96 is configured of a predetermined IC (analog front-end IC). The AFE 96 includes a gain adjusting unit 101 which increases or decreases an input signal using a gain G which is set with respect to input analog data, and outputs a signal with a necessary level, an A/D converter unit 102 which converts analog data into digital data, and the like. In addition, the AFE 96 may be mounted on a substrate in the carriage 53.

The reading control unit 95 controls turning on-off of the light source 52a according to a reading operation of the reading portion 52. In addition, the reading control unit 95 controls transmission of data which is read using the reading portion 52 to the A/D converter unit 102. The reading control unit 95 causes a timing generator which generates various signals based on a reference clock to generate a shift pulse and a reading clock, and controls a reading timing, or the like, of data from the reading portion 52. In addition, the timing generator may be provided in the carriage 53, or may be provided in the control unit 90.

The reading control unit 95 controls a movement of the carriage 53 by controlling driving of the first motor 55 of the driving mechanism 91. In addition, the reading control unit 95 controls image reading of the reading portion 52, reading of the white reference data, and reading of the black reference data. In addition, the reading control unit 95 stores the read white reference data 104, and the black reference data (not illustrated) in the storage unit 98.

When it is necessary to read the white reference plate before a reading operation in the ADF mode, the reading control unit 95 causes the carriage 53 to read the second white reference plate 82 when the carriage is at the standby position in the ADF mode. In addition, when it is necessary to read the white reference plate before a reading operation in the ADF mode, the reading control unit 95 causes the carriage 53 to read the first white reference plate 81 when the carriage is at the standby position in the FB mode.

In addition, when receiving a scanning job (scanning request), the reading control unit 95 causes the reading portion 52 to read the white reference plate before executing a current reading operation in order to obtain white reference data which is suitable for the current reading operation, when even one of the following white reference reading executing conditions is satisfied.

(1) A case in which a job is firstly received after power on.
(2) A case in which a job is received at a time of power saving mode.
(3) A case in which a current job is received after elapsing of a set time (for example, set time in a range of 1 min to 20 min), after finishing the previous job.
(4) A case in which a job in which setting of switching between monochrome and color is performed is received in the previous time and this time.
(5) A case in which a job in which a change of a reading resolution is set is received.
(6) A case in which a job in which a change of a mode is set is received.

Accordingly, in a case in which a current job is received in a set time after finishing the previous job, a case in which a job in the same mode as that in the previous time is received, or the like, the image reading device 31 does not read a white reference plate when conditions other than those are not satisfied.

The data processing unit 97 includes a shading correction unit 105 which performs a shading correction with respect to image data which is output from the A/D converter unit 102. The data processing unit 97 temporarily stores image data which is output from the A/D converter unit 102 in the storage unit 98, and performs a shading correction corresponding to a predetermined correction formula in each pixel using corresponding white reference data and black reference data. The data processing unit 97 performs various corrections such as a gamma correction, in addition to the shading correction, and outputs corrected image data to the output unit 100.

The storage unit 98 stores position information which denotes a standby position of the carriage 53 after finishing a reading operation which is performed by controlling the first motor 55 using the reading control unit 95, and data which is used when the data processing unit 97 performs various correction processes. Specifically, the storage unit 98 stores a standby position in the FB mode, and a standby position in the ADF mode which are determined as standby positions of the carriage 53 after finishing a job. In addition, the latest white reference data between the first white reference data which is read from the first white reference plate 81 and the second white reference data which is read from the second white reference plate 82 by the reading portion 52 is stored in the storage unit 98.

The output unit 100 includes an interface for performing a network connection or a USB connection, and transmits digital data which is output from the data processing unit 97 to the host device.

The above described control unit 90 is configured of a general computer which includes a CPU as a main control unit, a ROM in which a program, or the like, is stored, a RAM which temporarily stores data, or the like, as a main memory, an interface which controls an input-output with a host device, or the like, and a system bus which is a communication path between each of constituent elements. The control unit may be configured using an application specific integrated circuit (ASIC) which is provided so as to exclusively perform each process. The A/D converter unit 102 can be configured of an analog front end integrated circuit (IC).

The control unit 90 receives a scanning request from the host device which is connected to the multifunction printer 11 (image reading device 31 which is a part thereof) so as to communicate therewith. In addition, it is also possible to receive a scanning request by operating the operation unit 15. For example, when a user instructs copying by operating the operation unit 15 of the multifunction printer 11, for example, a main control unit (not illustrated) of the multifunction printer 11 requests scanning with respect to the image reading device 31. In addition, a printing control unit converts read data (for example, RGB color system data) from the image reading device 31 into print data (for example, CMYK color system data), and the printing device 21 prints a document or an image on a sheet based on the print data.

Figure 10:
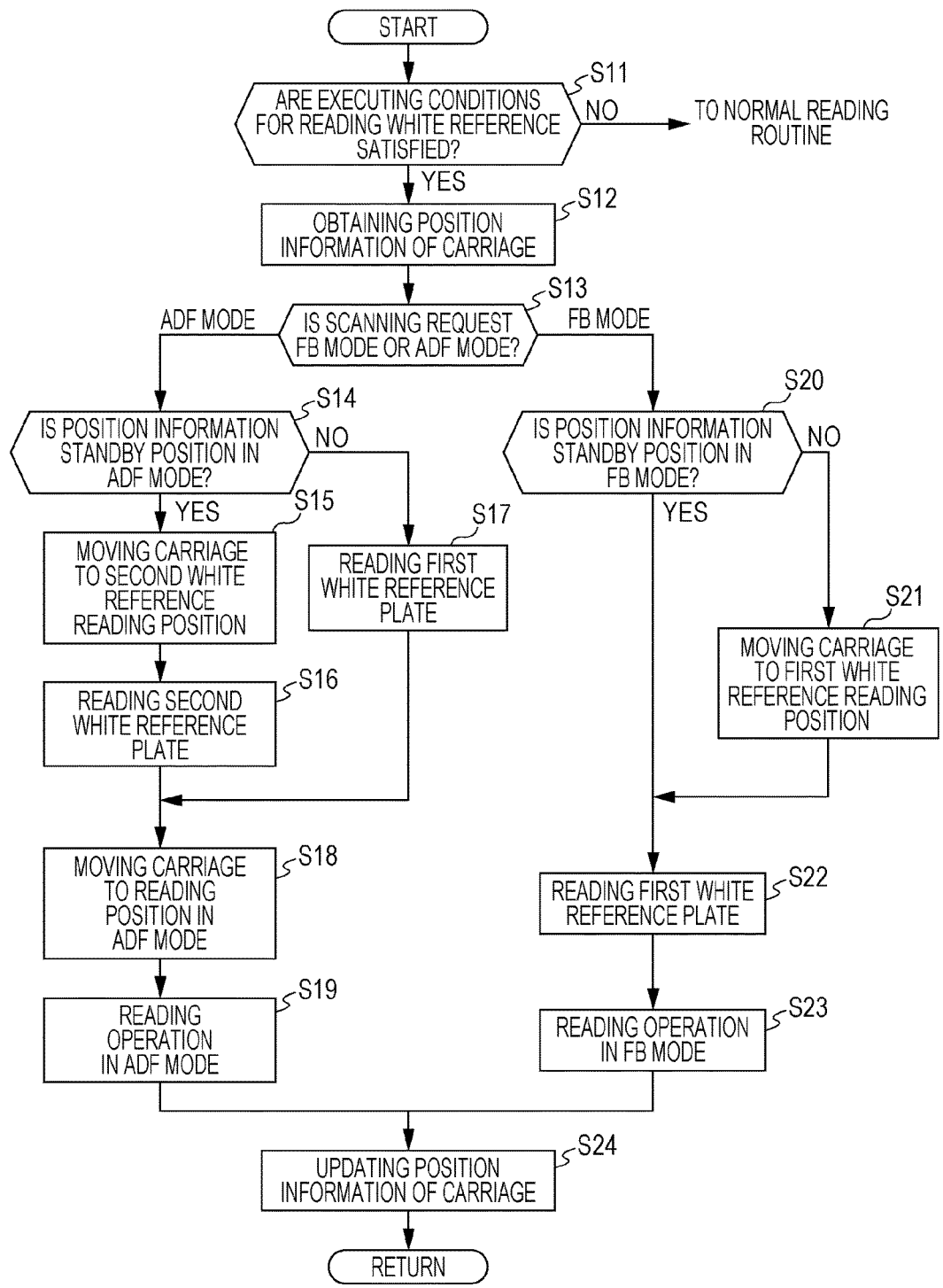
FIG. 10 is a flowchart which illustrates an image reading control routine.
Figure 11:
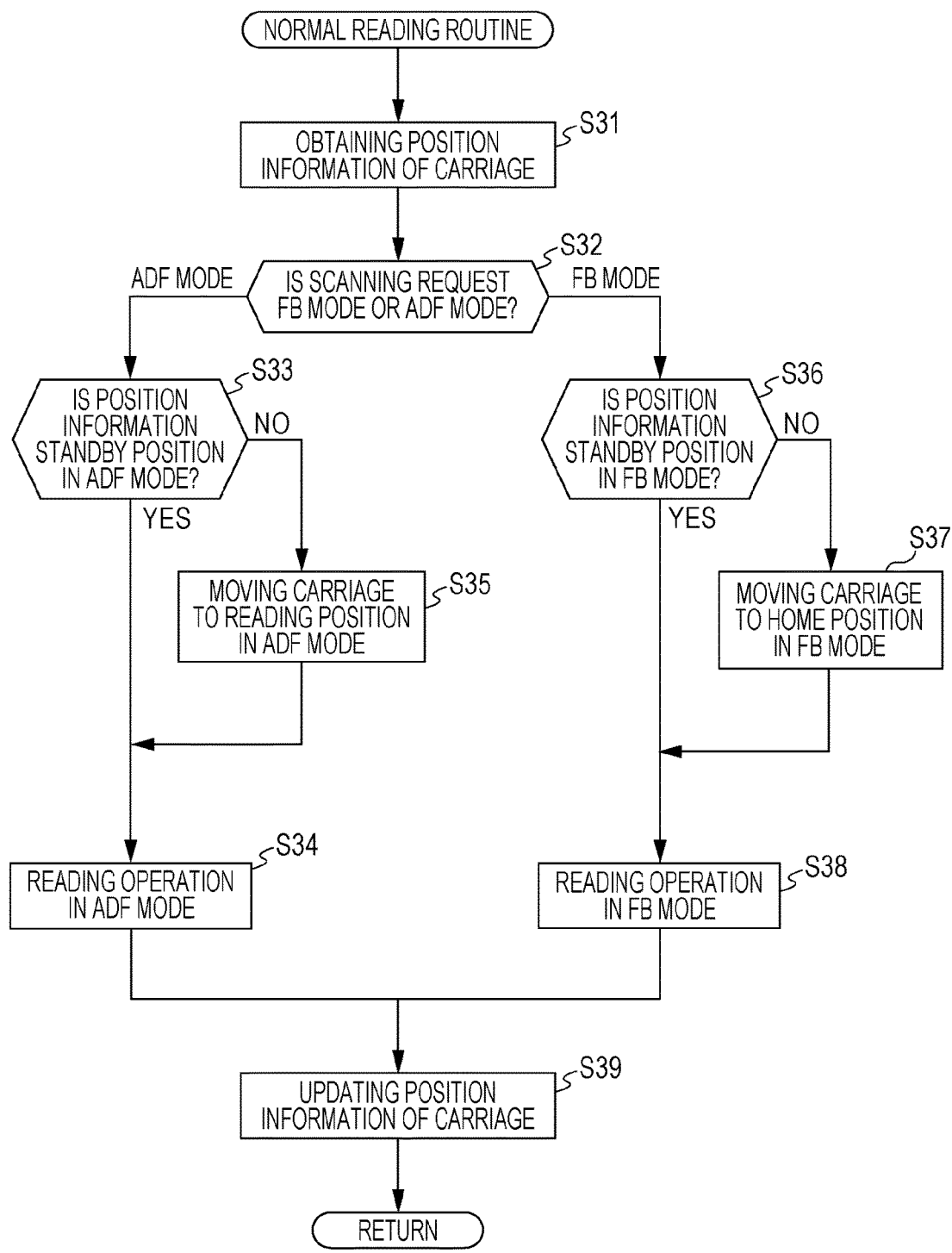
FIG. 11 is a flowchart which illustrates a normal reading routine in an image reading control.

Subsequently, operations of the image reading device 31 in the multifunction printer 11 will be described with reference to the flowcharts which are illustrated in FIGS. 10 and 11.

When a user instructs scanning by operating the operation unit (keyboard or mouse) in the host device (not illustrated), the multifunction printer 11 receives a scanning job through a wired or wireless communication from the host device. In addition, when a user instructs executing of scanning by operating the operation unit 15, or using a touch operation of the display unit 14, the multifunction printer 11 which receives the instruction generates a scanning job.

In addition, when executing of scanning is instructed by a user by operating the operation unit 15, or using a touch operation of the display unit 14, the multifunction printer 11 which receives the instruction generates a scanning job as a job which is provided to the image reading device 31. The scanning job which is received or generated by the multifunction printer 11 is transmitted to the image reading device 31. The image reading device 31 receives a scanning request by receiving the scanning job.

When a user instructs scanning or copying by setting a document on the document stand 33, the second sensor 44 enters a non-detecting state in which the second sensor 44 does not detect the document. When a scanning request is received, the control unit 90 determines that it is a scanning request in the FB mode, if the second sensor 44 is in the non-detecting state. On the other hand, when a document is set on the placing table 36, it is a detecting state in which the second sensor 44 detects the document. For this reason, when receiving a scanning request, the control unit 90 determines that it is a scanning request in the ADF mode, if the second sensor 44 is in the detecting state. In addition, when receiving a scanning request, the control unit 90 performs a reading operation in an instructed mode.

For example, when the previous reading operation is a reading operation in the FB mode, the carriage 53 stands by in the first standby position, for example, the first white reference reading position W1 in which it is possible to read the first white reference plate 81. At this time, position information 103 which denotes a current position (standby position) of the carriage 53 is stored in the storage unit 98. In addition, when the previous reading operation is a reading operation in the ADF mode, the carriage 53 stands by in the reading position SC. At this time, the position information 103 which denotes the current position (standby position) of the carriage 53 is stored in the storage unit 98. A process of obtaining position information of the carriage 53, and causes the storage unit 98 to store the information may be performed when receiving a current job, not after finishing the previous job. The position information 103 is stored in the storage unit 98 even when power of the multifunction printer 11 is turned off thereafter.

When power of the multifunction printer 11 is turned on, a home seeking operation of the carriage 53 is executed. In the home seeking operation, one home position between the two home positions HP1 and HP2 which is located in a position close to standby position (current position) of the carriage 53 which is specified by the position information 103 which is read from the storage unit 98 is set to a seeking target, and the home seeking operation is performed when the carriage 53 is moved to a direction which goes to a home position of the seeking target. When the home sensor 92 enters a detecting state, a position at the time is set to the first home position HP1, and when the reading portion 52 detects a not illustrated mark, a position at the time is set to the second home position HP2. The carriage 53 moves to a standby position which is close to the home position which is detected at the time after ending of the home seeking operation. The standby position is stored in the storage unit 98 as the position information 103. In the following descriptions, a standby position in the FB mode (first standby position) is set to the first white reference reading position W1, and a standby position in the ADF mode (second standby position) is set to the reading position SC.

When receiving a scanning request by receiving a scanning job, the control unit 90 (specifically, computer in control unit 90) executes a program of an image reading control routine which is illustrated in the flowcharts in FIGS. 10 and 11. Here, FIG. 10 illustrates an image reading control routine which is accompanied by a reading operation of the white reference plate when execution conditions for reading white reference are satisfied, and FIG. 11 illustrates a normal image reading control routine which is not accompanied by a reading operation of the white reference plate when the execution conditions for reading white reference are not satisfied.

First, in step S11 in FIG. 10, it is determined whether or not the execution conditions for reading white reference are satisfied. That is, as described above, if any one of the execution conditions for reading white reference which are defined in the following (1) to (6) is satisfied, it is determined that the execution conditions for reading white reference are satisfied. That is, (1) a case in which a job is firstly received after power on, (2) a case in which a job is received at a time of power saving mode, and (3) a case in which a current job is received after elapsing of a set time, after finishing the previous job are exemplified. In addition, (4) a case in which a job in which setting of switching between monochrome and color is performed is received in the previous time and this time, (5) a case in which a job in which a change of a reading resolution is set is received, and (6) a case in which a job in which a change of a mode is set is received are exemplified. In addition, when any one condition of the above described (1) to (6) is satisfied, it is determined that the execution conditions for reading white reference are satisfied (Yes in S11). When the execution conditions for reading white reference are satisfied, a reading operation of a document is performed in which reading of the white reference plate is performed before the reading operation in the process in step S12 and thereafter. On the other hand, when the execution conditions for reading white reference are not satisfied (No in S11), the process proceeds to the normal reading routine which is illustrated in FIG. 11.

In step S12 in FIG. 10, position information of the carriage 53 is obtained. That is, the control unit 90 reads the position information 103 which denotes a current standby position of the carriage 53 from the storage unit 98.

Subsequently, whether the scanning request is a request in the FB mode or in the ADF mode (step S13). When it is the ADF mode, subsequently, whether or not the position information is a standby position in the ADF mode (step S14). When the position information is the standby position in the ADF mode (Yes in S14), the carriage 53 is moved to the second white reference reading position W2 (step S15), and the second white reference plate 82 is read (step S16). Second white reference data 104 which is obtained by reading the second white reference plate 82 is written in a predetermined storage region of the storage unit 98.

On the other hand, when the position information is not the standby position in the ADF mode (for example, standby position in FB mode) (No in S14), the first white reference plate 81 is read (step S17). First white reference data 104 which is obtained by reading the first white reference plate 81 is written in a predetermined storage region of the storage unit 98.

In addition, the carriage 53 is moved to the reading position SC in the ADF mode (step S18), and a reading operation is performed in the ADF mode (step S19). In addition, when the reading operation is finished, position information of the carriage 53 is updated (step S24). That is, the standby position in the ADF mode (second white reference reading position W2, as an example) is written in the storage unit 98 as the position information 103 of the carriage 53.

On the other hand, when the scanning request is a request in the FB mode in step S13, subsequently, whether or not position information is the standby position in the FB mode is determined (step S20). When the position information is the standby position in the FB mode (Yes in S20), the second white reference plate 82 is read (step S22). On the other hand, when the position information is not the standby position in the FB mode (for example, standby position in ADF mode) (No in step S20), the carriage 53 is moved to the first white reference reading position W1 (step S21), and the first white reference plate 81 is read (step S22). In addition, the first white reference data 104 which is obtained by reading the first white reference plate 81 is written in a predetermined storage region of the storage unit 98. In addition, when the carriage 53 returns to the standby position in the FB mode after finishing the reading operation, position information of the carriage 53 is updated (step S24). That is, as the position information 103 of the carriage 53, the standby position in the FB mode (first white reference reading position W1, as an example) is written in the storage unit 98.

In step S11, when the execution conditions for reading white reference are not satisfied, and it is not necessary to read the white reference plate, the control unit 90 performs the following controls by executing a normal reading routine.

First, in step S31, position information of the carriage is obtained. That is, the control unit 90 reads the position information 103 from the storage unit 98.

Subsequently, whether the scanning request is a request in the FB mode or the ADF mode is determined (step S32). When the request is the ADF mode, subsequently, whether or not the position information is the standby position in the ADF mode is determined (step S33). When the position information is the standby position in the ADF mode (Yes in step S33), a reading operation is performed in the ADF mode (step S34). On the other hand, when the position information is not the standby position in the ADF mode (for example, standby position in FB mode) (No in S33), the carriage 53 is moved to the reading position in the ADF mode (step S35), and a reading operation is performed in the ADF mode (step S34). In addition, when the reading operation in the ADF mode is finished, the position information of the carriage 53 is updated (step S39). That is, as the position information 103 of the carriage 53, the standby position in the ADF mode is written (second white reference reading position W2, as an example) in the storage unit 98.

On the other hand, in step S32, when the scanning request is a request in the FB mode, subsequently, whether or not position information is the standby position in the FB mode is determined (step S36). When the position information is the standby position in the FB mode (Yes in S36), a reading operation is performed in the FB mode (step S38). In addition, when the position information is not the standby position in the FB mode (for example, standby position in ADF mode) (No in S36), the carriage 53 is moved to the home position HP1 in the FB mode (step S37), and a reading operation in the FB mode is performed (step S38). In addition, when the carriage 53 returns to the standby position in the FB mode after finishing the reading operation, the position information of the carriage 53 is updated (step S39). That is, as the position information 103 of the carriage 53, the standby position in the FB mode (first white reference reading position W1, as an example) is written in the storage unit 98.

A read signal (analog signal) which is read using the reading portion 52 by the above described reading operation is converted into a digital signal in AFE 96, and is sent to the data processing unit 97 as read data. In addition, the data processing unit 97 reads the latest white reference data 104 from the storage unit 98 in both modes, and performs a shading correction using the white reference data 104 with respect to the read data. At this time, the data processing unit 97 performs various image processing such as a gamma correction, in addition to the shading correction, and generates image data (scanned data). In addition, when scanning is instructed, the generated image data is transmitted to the host device from the output unit 100. Meanwhile, when copying is instructed, the generated image data is transmitted to the printing device 21. In addition, the printing device 21 converts the image data of, for example, an RGB color system or a YCbCr color system which is received from the image reading device 31 into print data of a CMYK color system, and prints a document image based on the print data on a sheet using a printing unit (not illustrated).

According to the embodiment, as the execution conditions for reading white reference, the above described (1) to (6) are set.

For this reason, when the subsequent job is received in a predetermined time after finishing a job, a document is read without performing reading of the white reference plate. In addition, position information is updated after reading the document.

When, after finishing a job, the subsequent job is received after elapsing of a predetermined time, a mode is confirmed along with reading of position information using the image reading control routine is illustrated in FIG. 10, and one white reference plate which is determined according to the position information and the mode is read. In addition, when, after finishing a job, the subsequent job in which setting of switching between monochrome and color is performed is received, a mode is confirmed along with reading of position information using the image reading control routine is illustrated in FIG. 10, and one white reference plate which is determined according to the position information and the mode is read.

When, after finishing a job, the subsequent job in which a change in a reading resolution is set is received, a mode is confirmed along with reading of position information using the image reading control routine is illustrated in FIG. 10, and one white reference plate which is determined according to the position information and the mode is read. In addition, when switching to a power saving mode is performed after finishing a job, and the subsequent job is received thereafter, a mode is confirmed along with reading of position information using the image reading control routine is illustrated in FIG. 10, and one white reference plate which is determined according to the position information and the mode is read.

The example in which the standby position of the carriage 53 after finishing a home seeking operation which is performed when power of the multifunction printer 11 is turned on is set to the first white reference reading position W1, when the first home position HP1 is sought, is described; however, the standby position may be set to the first home position HP1. In addition, when the second home position HP2 is sought, the example in which the standby position is set to the second white reference reading position W2 is described; however, the standby position may be set to the second home position HP2.

A standby position when a reading operation in the FB mode is finished may be set to the first home position HP1, instead of the first white reference reading position W1. In addition, a standby position when finishing a reading operation in the ADF mode may be set to the reading position SC or the second home position HP2, instead of the second white reference reading position W2.

According to the above described embodiment, it is possible to obtain the following effects.

(1) When it is necessary to read the white reference plate before a reading operation in the ADF mode (an example of second mode), the second white reference plate 82 which is closer than the first white reference plate 81 is read, when the carriage 53 is at the standby position in the ADF mode (second standby position). On the other hand, the first white reference plate 81 which is closer than the second white reference plate 82 is read, when the carriage 53 is at the standby position (first standby position) in the FB mode (an example of the first mode). Accordingly, it is possible to start the reading operation early by rapidly reading the white reference plate.

(2) When a job in which reading of the white reference plate is necessary is received by storing a standby position of the carriage 53 after finishing the last (previous) job in the storage unit 98, one of the first white reference plate 81 and the second white reference plate 82 which is located at a position in which a movement time of the carriage 53 from the position of the carriage 53 at the time is short is selected as a reading target. Accordingly, it is possible to rapidly read the white reference plate.

(3) In particular, when the last job is the ADF mode, and a new job is the ADF mode, since it is not necessary for the carriage 53 to pass a portion between large glass 33a for reading in the FB mode (an example of first transparent member) and the small glass 39a for reading in the ADF mode (an example of second transparent member), it is possible to rapidly read the second white reference plate 82. That is, a speed of the carriage 53 which moves the portion between the large glass 33a and the small glass 39a is relatively slow; however, the carriage may not pass through the low speed movement region, since the carriage may move to the second white reference plate 82 without moving from the second standby position to the first white reference plate 81 in the ADF mode. Accordingly, it is possible to start a reading operation in the ADF mode early by finishing reading of the second white reference plate 82 early.

(4) Since position information of the carriage 53 is updated after finishing reading operations of the carriage 53 in the FB mode and the ADF mode, if it is possible to obtain position information when receiving the subsequent reading request, the control unit 90 can ascertain a standby position (current position) of the carriage 53 from the position information 103.

(5) Also in a case in which a reading operation (for example, job) in the ADF mode is performed after the carriage 53 performed a home seeking operation at least at a time of power on, it is possible to rapidly read the white reference plate, since one of the first white reference plate 81 and the second white reference plate 82 which is closer to a standby position after finishing the home seeking operation is read. Accordingly, when a reading operation in the ADF mode is performed from the standby position at a time of finishing the home seeking operation, it is possible to make a standby time from receiving of a scanning request to start of a reading operation relatively short.

(6) Since there is a low speed process (low speed movement region) at a time of passing through the movement supporting unit 85 when the carriage 53 moves between the first region R1 and the second region R2, a movement time from the second region R2 to the first white reference reading position W1 in the first region R1 becomes relatively long in proportion to a movement distance thereof. Therefore, according to the embodiment, the first white reference plate 81 and the second white reference plate 82 are respectively arranged in the first region R1 and the second region R2. For this reason, when a reading operation in the ADF mode is performed in the second standby position, it is not necessary for the carriage to move from the second standby position in the second region R2 to the first white reference reading position W1 in the first region R1 through the low speed process, and it is possible to read the second white reference plate 82 by moving from the second standby position to the second white reference reading position W2 in the same second region R2. Accordingly, from this point, it is also possible to start a reading operation in the ADF mode early, relative to reading of the white reference plate.

Second Embodiment

Subsequently, a second embodiment will be described with reference to FIG. 12.

In the first embodiment, since it is a configuration in which, when receiving a scanning request, whether the request is the FB mode or the ADF mode is determined, and then a white reference plate corresponding to the mode is read, a frequency of performing a reading operation of a white reference plate is relatively high. Accordingly, it causes a long standby time from receiving of a scanning request to a start of a reading operation. In contrast to this, in the second embodiment, reading of a white reference plate is performed in advance, before receiving a scanning request.

Figure 12:
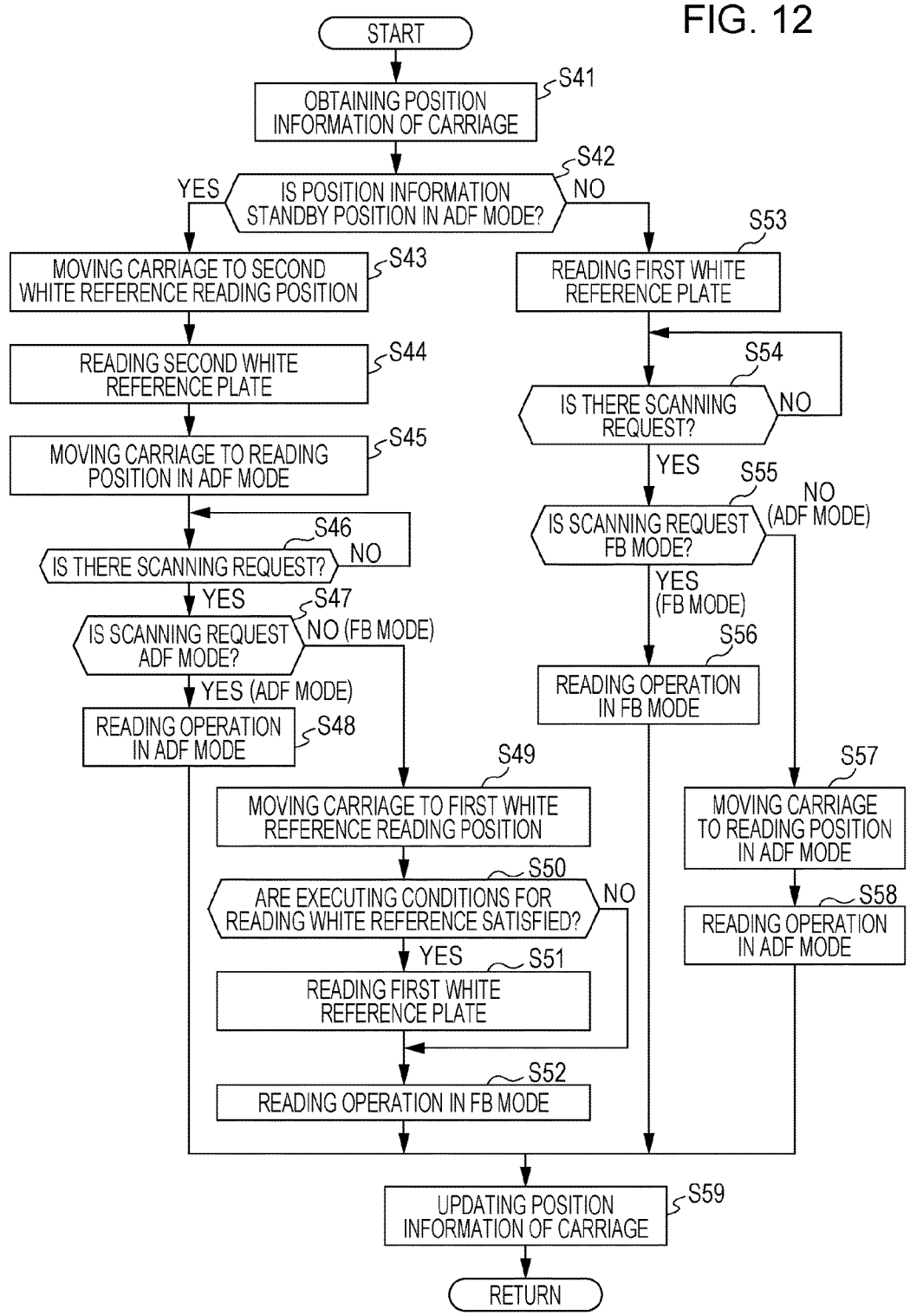
FIG. 12 is a flowchart which illustrates an image reading control routine according to a second embodiment.

A control unit 90 executes an image reading control routine which is illustrated in FIG. 12 every time the previous reading operation is finished. In addition, a standby position in the previous mode, that is, position information 103 which denotes a current position of the carriage 53 is stored in a storage unit 98.

First, in step S41 in FIG. 12, position information of the carriage is obtained. That is, the control unit 90 reads the position information 103 from the storage unit 98.

Subsequently, whether or not the position information is a standby position in the ADF mode is determined (step S42).

When the position information is the standby position in the ADF mode (Yes in S42), the carriage 53 is moved to the second white reference reading position W2 (step S43), and the second white reference plate 82 is read (step S44). Second white reference data 104 which is obtained by reading the second white reference plate 82 is written in a predetermined storage region of the storage unit 98. In addition, the carriage 53 is moved to a reading position in the ADF mode (step S45).

In addition, whether or not there is a scanning request is determined (step S46). When there is no scanning request, the carriage stands by until there is a scanning request, and when there is a scanning request (Yes in S46), whether or not it is the ADF mode is determined (step S47). When the scanning request is the ADF mode (Yes in S47), a reading operation is performed in the ADF mode (step S48). On the other hand, when the scanning request is not the ADF mode (that is, FB mode) (No in S47), the carriage 53 is moved to the first white reference reading position W1 (step S49). In addition, whether or not execution conditions for reading white reference are satisfied is determined (step S50).

That is, when even one of the execution conditions for reading white reference which are defined in the above described (1) to (6) is satisfied, it is determined that the execution conditions for reading white reference are satisfied (Yes in S50). When the execution conditions for reading white reference are satisfied, the first white reference plate 81 is read (step S51). In addition, first white reference data which is obtained by reading the first white reference plate 81 is stored in the storage unit 98.

Subsequently, a reading operation in the FB mode is performed (step S52). In addition, when the carriage returns to a standby position in the FB mode after the reading operation, position information of the carriage 53 is updated (step S59).

That is, the standby position in the FB mode is written in the storage unit 98 as the position information 103 of the carriage 53.

On the other hand, in step S42, when the position information is not the standby position in the ADF mode (for example, standby position in FB mode), the first white reference plate is read (step S53).

In addition, whether or not there is a scanning request is determined (step S54). When there is no scanning request, the carriage stands by until there is a scanning request, and when there is a scanning request (Yes in S54), whether or not the scanning request is the FB mode is determined (step S55). When the scanning request is the FB mode (Yes in S55), reading operation in the FB mode is performed (step S56). On the other hand, when the scanning request is not the FB mode (that is, ADF mode) (No in S55), the carriage 53 is moved to the reading position SC in the ADF mode (step S57). In addition, a reading operation in the ADF mode is performed (step S58). In addition, when returning to the standby position in the ADF mode after finishing the reading operation, position information of the carriage 53 is updated (step S59). That is, the standby position in the ADF mode is written in the storage unit 98 as the position information 103 of the carriage 53.

A read signal (analog signal) which is read using the reading portion 52 by performing the above described reading operation is converted into a digital signal in the AFE 96, and is transmitted to the data processing unit 97 as read data thereafter. In addition, in both of the modes, the data processing unit 97 generates image data (scanned data) by performing various image processing including a shading correction using the latest white reference data 104 which is read from the storage unit 98 with respect to the read data.

In this manner, in the image reading device 31 according to the second embodiment, position information of the carriage 53 is obtained before receiving a scanning request, and when the carriage 53 is at a standby position in the ADF mode (for example, reading position SC) the second white reference plate 82 is read, and when the carriage is at a standby position in the FB mode (for example, first white reference reading position W1), the first white reference plate 81 is read. For this reason, when there is a scanning request, it is possible to rapidly start a reading operation of a document without reading the white reference plate except for some cases.

Since white reference data with a high resolution is read when the first white reference plate 81 is read, it is possible to rapidly start a reading operation of a document in the ADF mode without reading the white reference plate, even when a scanning request in the ADF mode is received thereafter. Since white reference data with a low resolution is obtained when the second white reference plate 82 is read, if a scanning request in the ADF mode is received thereafter, it is possible to rapidly start a reading operation of a document in the ADF mode without reading the white reference plate; however, when it is a scanning request in the FB mode, a reading operation of a document in the FB mode is started after reading the first white reference plate 81.

As described above, according to the second embodiment, it is possible to obtain the following effects.

(7) When a job is the same ADF mode or FB mode as that in the previous job, it is possible to rapidly start a reading operation of a document by reading one white reference plate corresponding to a standby position of the carriage 53 which is specified from the position information 103 which is read from the storage unit 98 in advance before receiving a scanning request.

Third Embodiment

Subsequently, a third embodiment will be described with reference to FIGS. 13 and 14.

In the second embodiment, since a white reference plate which is close to the standby position of the carriage 53, that is, a white reference plate corresponding to the previous mode is read based on the position information after finishing the previous reading operation, a case in which the white reference plate which is read in advance does not correspond to the subsequent mode occurs at a constant frequency. In contrast to this, according to the third embodiment, a configuration is adopted in which, when the fact that a document is set on one of the document stand 33 and the placing table 36 is detected from a detection result of the first and second sensors 43 and 44, one white reference plate corresponding to a mode which is specified from the one on which the document is set is read in advance before receiving a scanning request.

In the embodiment, the control unit 90 detects that a document is set on the document stand 33 when detecting that the document stand cover 34 is closed after being opened based on an output signal from the first sensor 43 which enters a detecting state when the document stand cover 34 is closed, and enters a non-detecting state when the document stand cover is open. In addition, the control unit 90 determines that a document is taken out from the document stand 33 when detecting that the document stand cover 34 is firstly opened and closed after finishing a reading operation in the FB mode. That is, the control unit detects that a document is set on the document stand by detecting opening and closing of the document stand cover 34 in the second time and thereafter, after finishing the reading operation in the FB mode. In addition, a presence or absence of a document may be detected by detecting a part of region of the document stand 33 using the reading portion 52 by moving the carriage 53 to a region of the document stand 33, and in this case, setting of a document on the document stand 33 is detected based on detecting of the document using the reading portion 52.

The control unit 90 recognizes detecting order of the first sensor 43 and the second sensor 44. In addition, when both the first sensor 43 and the second sensor 44 enter the detecting state, the control unit 90 causes a reading operation to be performed in a mode corresponding to one of the first sensor 43 and the second sensor 44 which lastly entered the detecting state. When a user instructs scanning by operating the host device (for example, personal computer), or the operation panel 13, the control unit 90 receives a scanning job. The control unit 90 receives a scanning request after receiving a scanning job, and executes the received scanning job. When it turns out that a sensor which detects setting of a document on one of the document stand 33 and the placing table 36 on which the document is lastly set is the first sensor 43 based on a detection result of the first sensor 43 and the second sensor 44, when receiving the scanning request, the reading operation is performed in the first mode. In addition, when it turns out that a sensor which detects setting of a document on one of the document stand 33 and the placing table 36 on which the document is lastly set is the second sensor 44 based on the detection result of the first sensor 43 and the second sensor 44, a reading operation in the ADF mode is performed.

When power of the multifunction printer 11 is turned on, a home seeking operation of the carriage 53 is executed. After the home seeking operation, the carriage 53 is at the first home position HP1 or the second home position HP2. On the other hand, when a reading operation in the FB mode or the ADF mode is performed, the carriage 53 is at a standby position after the previous reading operation. That is, when the previous reading operation is the FB mode, the carriage 53 is at the first standby position (first white reference reading position W1), and on the other hand, when the previous reading operation is the ADF mode, the carriage 53 is at the reading position SC. The position information 103 which denotes a position of the carriage 53 is stored in the storage unit 98.

Hereinafter, operations of the image reading device 31 in the third embodiment will be described with reference to FIGS. 13 and 14. The control unit 90 executes an image reading control routine which is illustrated in FIGS. 13 and 14 after finishing the home seeking operation at a time of power on, or the previous reading operation.

Figure 13:
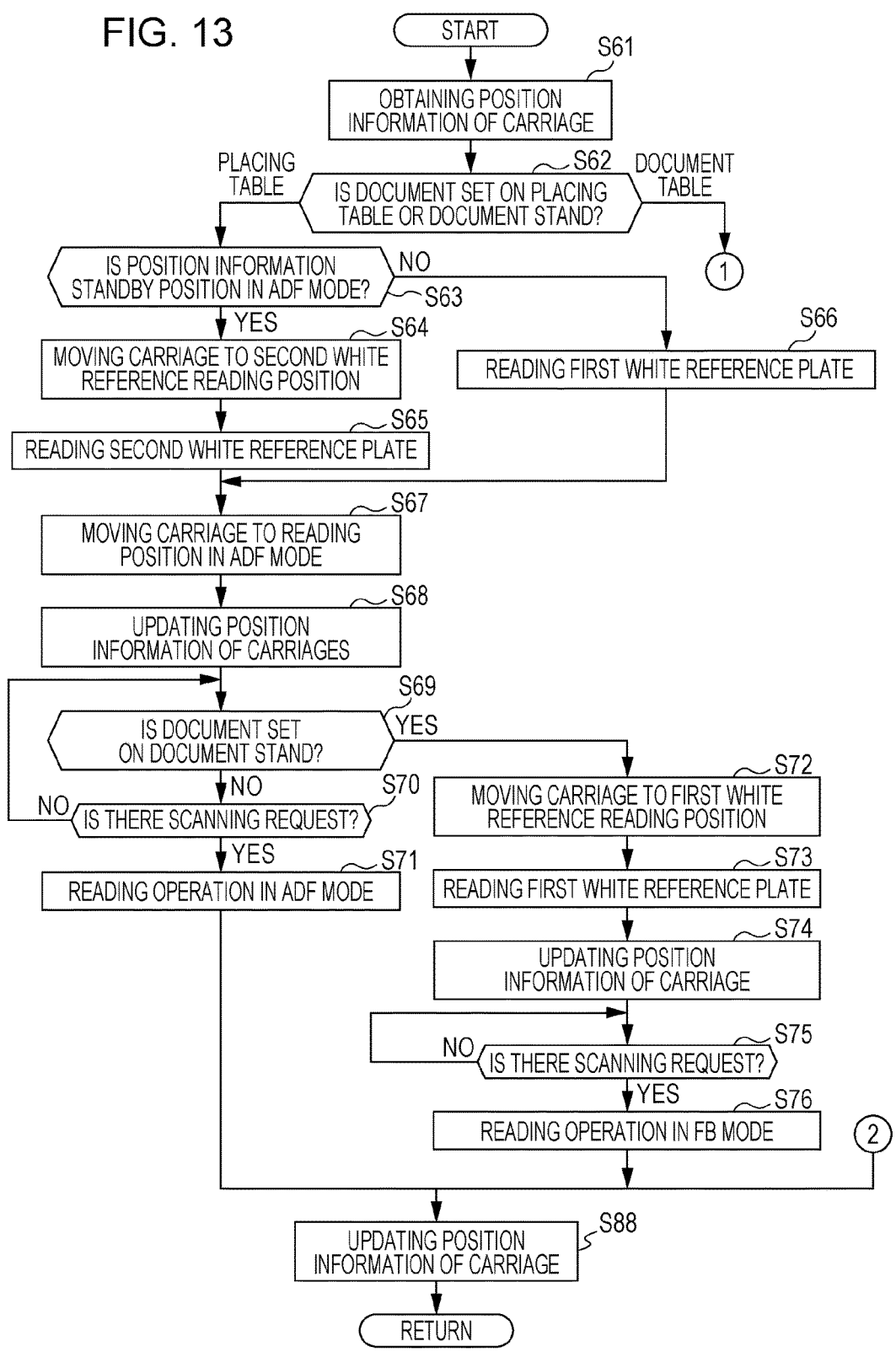
FIG. 13 is a flowchart which illustrates a part of image reading control routine according to a third embodiment.

First, in step S61 in FIG. 13, position information of the carriage is obtained. That is, the control unit 90 reads the position information 103 from the storage unit 98.

Subsequently, whether or not a document is set on the placing table 36 or the document stand 33 of the document transport unit 35 is determined (step S62). The control unit 90 detects that a document is set on any one of the document stand 33 and the placing table 36 from detection results of the first and second sensors 43 and 44. When it is determined that a document is set on the placing table 36, subsequently, whether or not position information is a standby position in the ADF mode is determined (step S63). When the position information is the standby position in the ADF mode (Yes in S63), the carriage 53 is moved to the second white reference reading position W2 (step S64), and the second white reference plate 82 is read (step S65). On the other hand, when the position information is not the standby position in the ADF mode (No in S63), the first white reference plate 81 is read (step S66). That is, since the carriage 53 is at the standby position in the FB mode (first white reference reading position W1), the first white reference plate 81 is read in the standby position. In addition, when the standby position in the FB mode is set to a position other than the first white reference reading position W1 (for example, first home position HP1), the first white reference plate 81 is read after moving the carriage 53 to the first white reference reading position W1 from the standby position.

Subsequently, the carriage 53 is moved to a reading position in the ADF mode (step S67), and position information of the carriage 53 is updated. That is, the position information 103 of the storage unit 98 is rewritten as the reading position SC in the ADF mode.

Subsequently, whether or not a document is set on the document stand 33 is determined (step S69). When a document is not set on the document stand 33, whether or not there is a scanning request is determined. In addition, both of the determining processes are repeated until a document is set on the document stand 33 (Yes in S69) or there is a scanning request (Yes in S70), and enters a standby state. In addition, when there is a scanning request, a reading operation is performed in the ADF mode (step S71). At this time, since reading of the second white reference plate 82 (S65) or the first white reference plate 81 is finished in advance before receiving a scanning request, it is not necessary to read the second white reference plate 82 before starting the reading operation. Accordingly, when there is a scanning request, it is possible to rapidly start a reading operation in the ADF mode. In addition, when the reading operation in the ADF mode is finished, position information of the carriage 53 is updated (step S88). That is, as the position information 103 of the carriage 53, a standby position in the ADF mode is written in the storage unit 98.

On the other hand, when a document is set on the document stand 33 (Yes in S69), the carriage 53 is moved to the first white reference reading position W1 (step S72), and the first white reference plate 81 is read (step S73). The first white reference data 104 which is obtained by reading the first white reference plate 81 is written in a predetermined storage region of the storage unit 98. In addition, position information of the carriage 53 is updated (step S74). That is, the first white reference reading position W1 is written in the storage unit 98 as the position information 103 of the carriage 53. When the first white reference plate 81 is read in step S66, processes in steps S72 to S74 are omitted. For example, a flag which can specify a type of a white reference plate which is read in advance is prepared in the control unit 90, and when the flag means a value obtained by reading the second white reference plate 82, processes in S72 to S74 are executed, and when the flag means a value obtained by reading the first white reference plate 81, the processes in S72 to S74 are omitted.

Subsequently, whether or not there is a scanning request is determined (step S75), and when there is no scanning request, it enters a standby state until a scanning request is received. In addition, when there is a scanning request, a reading operation in the FB mode is performed (step S76). Since reading of the first white reference plate 81 (S73) is finished in advance before the reading operation, a reading operation of the first white reference plate 81 is not necessary before starting the reading operation. Accordingly, when there is a scanning request, it is possible to rapidly start the reading operation in the FB mode.

In addition, when the reading operation in the FB mode is finished, position information of the carriage 53 is updated (step S88). That is, the standby position in the FB mode is written in the storage unit 98 as the position information 103 of the carriage 53.

Figure 14:
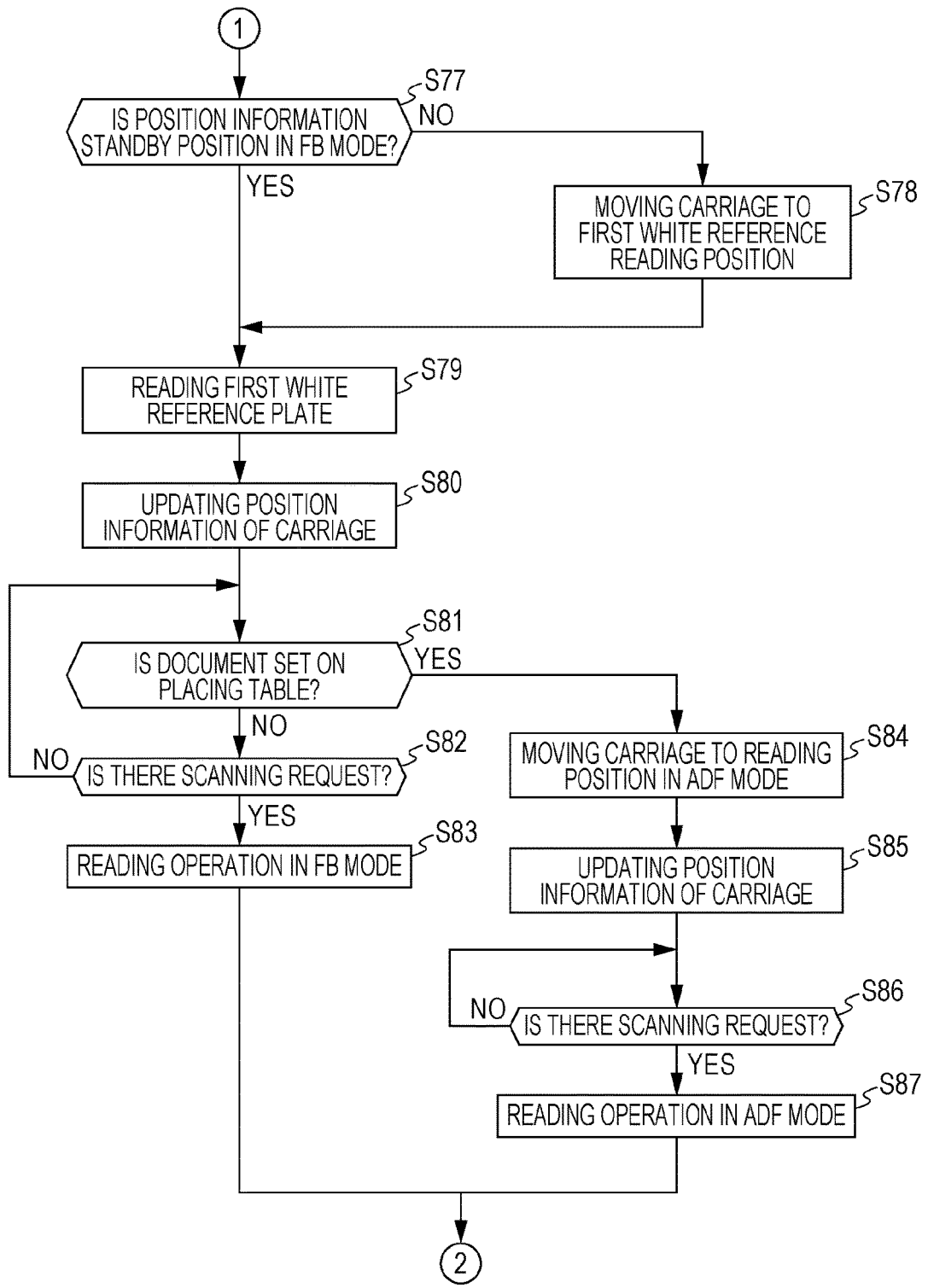
FIG. 14 is a flowchart which illustrates another part of the image reading control routine.

On the other hand, when a document is set on the document stand 33 in step S62, the process proceeds to step S77 in FIG. 14, and whether or not position information is the standby position in the FB mode is determined.

In addition, when the position information is the standby position in the FB mode (Yes in S77), the first white reference plate 81 is read (step S79). That is, in the embodiment in which the standby position in the FB mode is the first white reference reading position W1, the carriage 53 reads the first white reference plate 81 using the reading portion 52 in the standby position.

On the other hand, when the position information is not the standby position in the FB mode (No in S77), the carriage 53 is moved to the first white reference reading position W1 (step S78), and the first white reference plate 81 is read (step S79). Subsequently, position information of the carriage 53 is updated (step S80). That is, the first white reference reading position W1 is written in the storage unit 98 as the position information 103 of the carriage 53.

Subsequently, whether or not a document is set on the placing table 36 is determined (step S81). When a document is not set on the placing table 36, whether or not there is a scanning request is determined (step S82). In addition, it enters a standby state while repeating both the determining processes until a document is set on the placing table 36 (Yes in S81), or there is a scanning request (Yes in S82). In addition, when there is a scanning request, a reading operation in the FB mode is performed (step S83). Since reading of the first white reference plate 81 (S79) is finished in advance before receiving the scanning request, a reading operation of the first white reference plate 81 is not necessary before starting the reading operation. Accordingly, when there is a scanning request, it is possible to rapidly start a reading operation in the FB mode. In addition, when the reading operation in the FB mode is finished, position information of the carriage 53 is updated (step S88). That is, the standby position in the FB mode is written in the storage unit 98 as the position information 103 of the carriage 53.

On the other hand, when a document is set on the placing table 36 (Yes in S81), the carriage 53 is moved to the reading position SC in the ADF mode (step S84). Subsequently, position information of the carriage 53 is updated (step S85). That is, the reading position SC in the ADF mode is written in the storage unit 98 as the position information 103 of the carriage 53 (step S85).

Subsequently, whether or not there is a scanning request is determined (step S86), and when there is no scanning request, it enters a standby state until a scanning request is received. In addition, when there is a scanning request (Yes in S86), a reading operation in the ADF mode is performed (step S87). Since reading of the first white reference plate 81 (S79) is finished in advance before the reading operation, it is not necessary to read the white reference plate before starting the reading operation. Accordingly, when there is a scanning request, it is possible to rapidly start a reading operation in the ADF mode. In addition, when the reading operation in the ADF mode is finished, position information of the carriage 53 is updated (step S88). That is, the standby position in the ADF mode is written in the storage unit 98 as the position information 103 of the carriage 53.

A read signal (analog signal) which is read using the reading portion 52 using the above described reading operation is converted into a digital signal in the AFE 96, and is transmitted to the data processing unit 97 as read data thereafter. In addition, also in any mode, the data processing unit 97 generates image data (scanning data) by performing various image processing including a shading correction using the latest white reference data 104 which is read from the storage unit 98 with respect to read data.

As described above, it is possible to obtain the following effects according to the third embodiment.

(8) When the first sensor 43 or the second sensor 44 detects that a document is set on the document stand 33 or the placing table 36, since a white reference body is read even before receiving a reading request (for example, before receiving job), it is possible to rapidly start a reading operation of a document after receiving a reading request (after receiving job). Since reading of the white reference body is rapidly performed based on detection information which denotes setting of a document, it is possible to make a standby time from a scanning request to a start of reading operation of a document short, and to reduce throughput. Since position information is updated before receiving a job, even when there is no scanning request, and it is necessary to read the white reference plate again thereafter, it is possible to perform reading of one appropriate white reference plate in the plurality of white reference plates 81 and 82 from position information at the time.

(9) When documents are set both the document stand 33 and the placing table 36, a document which is lastly set is preferentially read. For this reason, in a case in which a user forget to take out a document on the document stand 33, or a case in which a document is set on the placing table 36; however, there is a document to be preferentially scanned, and the document is set on the document stand 33, it is possible to preferentially perform scanning of the document which is to be preferentially scanned, and is set later. For example, in a state in which a document which is read in the FB mode is not taken out from the document stand 33, a document D2 is set on the placing table 36 thereafter, and even when the fact that documents are set on both the document stand 33 and the placing table 36 is detected based on detection results of both the sensors 43 and 44, reading of the document which is set on the placing table 36 later is started. For this reason, it is possible to read a document which is desired by a user.

(10) When the document which is set later is on the placing table 36 of the document transport unit 35, since reading of the first white reference plate 81 is already finished, it enters a standby state waiting for reading of a document, without performing new reading of a white reference plate. For this reason, it is possible to start a reading operation of a document immediately when receiving a scanning request, and to reduce throughput.

In addition, it is also possible to change the above described embodiments to the following forms.

Controls of both of the second embodiment and the third embodiment may be performed. That is, when one white reference plate corresponding to position information of a carriage is read in advance, and one of the first sensor 43 and the second sensor 44 enters a detecting state thereafter, whether or not reading of the white reference plate corresponding to a mode corresponding to the sensor which entered the detecting state is finished is determined. When reading of the white reference plate is finished, it enters a standby state as is, and when reading of the white reference plate is not finished, reading of the white reference plate corresponding to the mode corresponding to the sensor which entered the detecting state is started. According to such a configuration, it is possible to reduce a frequency of reading a white reference plate after receiving a scanning request, and to increase a frequency of starting a reading operation of a document rapidly.

A reading resolution of the first white reference plate and the second white reference plate may be the same. For example, the first white reference plate and the second white reference plate may be read in a high resolution together. In addition, in each of the embodiments, a reading resolution of the first white reference plate may be switched according to a mode. For example, a reading resolution of the first white reference plate is read in a low resolution at a time of the ADF mode (example of second mode), and is read in a high resolution at a time of the FB mode (example of first mode).

In each of the embodiments, it may be a configuration in which, even when the carriage is at a standby position in the first mode (first standby position), the carriage 53 is moved to the second white reference reading position W2, and the second white reference plate 82 is read.

In the second and third embodiments, there may be a case in which a white reference plate is read in a white reference reading position corresponding to a standby position at the time, and thereafter, the execution conditions for reading white reference are satisfied after elapsing of a set time without a scanning request. Therefore, whether or not the execution conditions for reading white reference are satisfied is monitored after performing reading of the first white reference plate or the previous white reference plate (S44, S53, S65, S73, and S79), and when the execution conditions for reading white reference are satisfied for some reasons such as elapsing of a set time before receiving a scanning request, it is also possible to perform reading of the white reference plate again. In this case, it is preferable to continue monitoring of the execution conditions for reading white reference (whether or not the conditions are satisfied) until transferring to a power saving mode, for example. According to the configuration, it is possible to perform a shading correction with respect to read data using white reference data which is suitable for the execution conditions for reading white reference, even when it takes time from a time of reading a white reference plate which is performed before receiving a scanning request to a time of actually receiving a scanning request.

In each of the embodiments, a position of the second white reference reading position W2 may be set to the same side as the first white reference reading position W1 with respect to the reading window 39, as long as it is set to the second white reference reading position W2 in which a movement time (particularly, movement distance) of the carriage 53 from the second standby position becomes short compared to a case of moving to the first white reference reading position W1. In this case, in a configuration in which the movement supporting unit 85 is included, it is preferable to set the second white reference reading position W2 (second white reference plate 82) to a position on the second standby position side rather than the movement supporting unit 85.

In each of the embodiments, the movement supporting unit 85 may be omitted. For example, the document stand 33 and the reading window 39 may be configured using one common transparent plate (for example, glass plate). According to the configuration, since there is no concern that the reading portion 52 may be caught at an end portion of the glass plate, and it is not necessary to provide a low speed process (low speed movement region) in a movement process of the carriage 53 between the first region R1 and the second region R2 even when there is no movement supporting unit, it is possible to start a current reading operation relatively early even when a mode is switched between the previous time and this time.

When documents are placed on both of the placing table and the document stand of the document transport unit, and both of the first sensor 43 and the second sensor 44 are turned on (detecting state), a reading operation may be performed in the ADF mode (second mode) in which a document which is placed on the placing table 36 of the document transport unit 35 is read, regardless of detecting order.

The first white reference plate is used for a high resolution, and the second white reference plate is used for a low resolution; however, both of the plates may be read using the same resolution. For example, both the first and second white reference plates may be read in a high resolution, or in a low resolution.

There are two modes which are provided; however, a plurality of modes of three or more may be provided. In this case, a white reference plate may be provided in each mode. In addition, a white reference plate may be set to a common plate in at least two modes in the plurality of modes. In brief, two modes of the FB mode (first mode) in which a document on the document stand is read, and the ADF mode (second mode) in which a document which is set on the placing table of the document transport unit 35 is read may be included.

In each of the embodiments, the second home position HP2 and the reading position SC may be set to the same position. In addition, the first home position HP1 and the first white reference reading position W1 may be set to the same position. In addition, the second home position HP2 and the second white reference reading position W2 may be set to the same position.

In each of the embodiments, the carriage 53 after a reading operation in the first mode is caused to return to the first white reference reading position W1 corresponding to the mode at the time; however, the carriage may be caused to return to the first home position HP1. Since a movement distance to the first white reference reading position W1 is short even when the carriage is caused to return to the first home position HP1, it is possible to obtain approximately the same effect. In addition, the carriage 53 after a reading operation in the second mode is caused to return to the second white reference reading position W2 corresponding to the mode at the time; however, the carriage may be caused to return to the second home position HP2. Since a movement distance to the second white reference reading position W2 is short even when the carriage is caused to return to the second home position HP2, it is possible to obtain approximately the same effect.

A storage capacity of the white reference data may be secured to an extent in which the first white reference data and the second white reference data can be stored. In this case, when white reference data which is read in the same mode as that in a current job, and of which a set time has not elapsed is stored in the storage unit 98, even if the current job and the previous job are different from each other, reading of the white reference plate may be omitted. In addition, when the white reference plate which is previously read using the same condition (monochrome or color) as the condition after being switched present in the storage unit, reading of the white reference plate can be omitted.

It may be a configuration in which the first white reference body is not arranged at a position which is closer to the first standby position than the second white reference body, or the second white reference body is not arranged at a position which is closer to the second standby position than the first white reference body. In brief, it may be a configuration in which the carriage 53 can move to a reading position of the white reference body in a shirt time. That is, it is enough when the first white reference body is arranged at a position to which the first white reference body moves from the first standby position in a short time compared to the second white reference body, and the second white reference body is arranged at a position to which the second white reference body moves from the second standby position in a short time compared to the first white reference body. For example, in the first embodiment, even when the distance from the second standby position to the second white reference reading position W2 is the same as the distance from the second standby position to the first white reference reading position W1, or is longer than that, it is enough when a movement time from the second standby position to the second white reference plate 82 is shorter than a movement time from the second standby position to the first white reference reading position W1 which is necessary for a movement accompanying the low speed movement region.

Receiving of a job in which a change of mode is set may be excluded from the execution conditions for reading white reference. In this case, even when the job in which a change of mode is set is received, reading of the white reference plate is not performed. However, when it is a change from the second mode (ADF mode) to the first mode (FB mode), the first white reference reading position W1 may be read since the reading portion 52 passes through the first white reference plate 81.

In the third embodiment, when it is detected that documents are set on both of the document stand 33 and the placing table 36, the ADF mode may take a priority. That is, it is preferable to give a priority to a side on which a document is reliably set.

In the second and third embodiments, the carriage 53 may only be moved to the white reference reading positions W1 and W2. In this case, it becomes a configuration in which, when there is a scanning request, the carriage 53 is not moved, and reading of the white reference plate is performed in the position. Also in this configuration, it is possible to reduce throughput from a time of receiving a scanning request to a start of a reading operation.

Reading of the white reference plate may be performed every time a job is received.

In the second and third embodiments, reading of the white reference plate which is performed in advance before receiving a scanning request may be performed only when the execution conditions for reading white reference are satisfied, after the control unit 90 confirms whether or not the conditions are satisfied.

In the second and third embodiments, it may be a configuration in which whether or not the execution conditions for reading white reference are satisfied is confirmed after reading of the white reference plate which is performed in advance before a scanning request, and reading of the white reference plate is performed again, every time the execution conditions for reading white reference are satisfied.

In each of the embodiments, a sensor which directly detects a document which is set on the document stand 33 may be used as an example of the first sensor. For example, it may be a configuration in which a sensor other than the reading portion 52 (image sensor) is provided, whether or not there is a document on the document stand 33 is detected, and determines that a document is set on the document stand 33 by detecting the document.

Each functional unit which is provided in the control unit 90 of the image reading device 31 may be realized in software using a computer which executes a program, may be realized in hardware using an electronic circuit such as an ASIC, or may be realized in cooperation with the software and the hardware.

The image reading device is not limited to a configuration as a part of the multifunction printer. The image reading device may be a scanner including a document transport unit (ADF).

The entire disclosure of Japanese Patent Application No. 2014-215629, filed Oct. 22, 2014 is expressly incorporated by reference herein.

What is claimed is:

1. An image reading device comprising:
a document stand at which a document can be fixed;
a document transport unit which transports a document which is placed on a placing table on a path which passes through a reading position;
a carriage which includes a reading portion, and can move in a reading range in which a document fixed at the document stand can be read using the reading portion, and a movement range including the reading position;
a movement driving unit which moves the carriage;
a control unit which controls the document transport unit, the reading portion, and the movement driving unit, and performs a reading operation in a first mode in which a document fixed at the document stand is read using the reading portion by moving the carriage in the reading range, and the carriage returns to a first standby position, and a second mode in which the document which is transported using the document transport unit is read using the reading portion in a state in which the carriage is stopped in the reading position, and the carriage stops in a second standby position; and
a first white reference body and a second white reference body for a shading correction,
wherein the first white reference body is arranged in a position which is closer to the first standby position than the second white reference body, and the second white reference body is arranged in a position which is closer to the second standby position than the first white reference body, and
wherein, when one of the first or the second white reference body is to be read using the reading portion before a reading operation in the second mode, the control unit causes the carriage to read the second white reference body when the carriage is in the second standby position, and causes the carriage to read the first white reference body when the carriage is in the first standby position.

2. The image reading device according to claim 1, further comprising:
a storage unit which stores position information which denotes a standby position of the carriage after a reading operation of the carriage,
wherein the control unit updates position information of the carriage after finishing reading operations of the carriage in the first and second modes.

3. The image reading device according to claim 1,
wherein a home seeking operation in which the carriage seeks a home position is performed when at least at a time of power on, and
wherein, when a first reading operation after the home seeking operation is the second mode, reading of one of the first white reference body and the second white reference body corresponding to a standby position of the carriage after the home seeking operation is performed.

4. The image reading device according to claim 1, further comprising:
a first transparent member which configures the document stand;
a second transparent member which is at a reading position in the second mode; and
a support unit which supports the first transparent member and the second transparent member,
wherein, when the carriage moves in a range between the first transparent member and the second transparent member, a speed of the carriage which moves in a section between the first transparent member and the second transparent member is lower than a speed of the carriage which moves in another section.

5. The image reading device according to claim 1,
wherein the first standby position is a first white reference reading position in which the reading portion can read the first white reference body, and the second standby position is a reading position in which the reading portion can read a document in the second mode, or a second white reference reading position in which the reading portion can read the second white reference body.

6. An image reading device comprising:
a document stand at which a document can be fixed;
a document transport unit which transports a document which is placed on a placing table on a path which passes through a reading position;
a carriage which includes a reading portion, and can move in a reading range in which a document fixed at the document stand can be read, and a movement range including the reading position;
a movement driving unit which moves the carriage; and
a control unit which controls the document transport unit, the reading portion, and the movement driving unit, and performs a reading operation in a first mode in which a document fixed at the document stand is read using the reading portion by moving the carriage in the reading range, and returns the carriage to a first standby position, and a second mode in which an image of a document which is transported using the document transport unit is read using the reading portion in a state in which the carriage is stopped in the reading position, and the carriage stops in a second standby position;
a first white reference body which is located in a range from the first standby position to a position which is extended to the reading range;
a second white reference body which is arranged at a position closer to the reading position than the first white reference body;
a first sensor which detects that a document is set in the document stand; and
a second sensor which detects that a document is set in the placing table,
wherein the control unit causes the first white reference body to be read in a case where the first sensor enters a detecting state, causes the second white reference body to be read when the carriage is at the reading position, and causes the first white reference body to be read when the carriage is at the first standby position in a case where the second sensor enters a detecting state.

7. The image reading device according to claim 6,
wherein the control unit recognizes detecting order of the first sensor and the second sensor, and
wherein a reading operation is performed in a mode corresponding to one of the first sensor and the second sensor which is lastly detected, when both the first sensor and the second sensor enter a detecting state.

8. The image reading device according to claim 6, further comprising:
a first transparent member which configures the document stand;
a second transparent member which is at a reading position in the second mode; and
a support unit which supports the first transparent member and the second transparent member,
wherein, when the carriage moves in a range between the first transparent member and the second transparent member, a speed of the carriage which moves in a section between the first transparent member and the second transparent member is lower than a speed of the carriage which moves in another section.

9. The image reading device according to claim 6,
wherein the first standby position is a first white reference reading position in which the reading portion can read the first white reference body, and the second standby position is a reading position in which the reading portion can read a document in the second mode, or a second white reference reading position in which the reading portion can read the second white reference body.

* * * * *